United States Patent
Wang et al.

(10) Patent No.: US 9,838,686 B2
(45) Date of Patent: Dec. 5, 2017

(54) TECHNIQUES FOR INCLUSION OF THUMBNAIL IMAGES IN COMPRESSED VIDEO DATA

(71) Applicant: Intel Corporation, Santa Clara, CA (US)

(72) Inventors: Ce Wang, Bellevue, WA (US); Changliang Wang, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 148 days.

(21) Appl. No.: 13/940,803

(22) Filed: Jul. 12, 2013

(65) Prior Publication Data

US 2015/0016514 A1    Jan. 15, 2015

(51) Int. Cl.
  *H04N 19/44* (2014.01)
  *H04N 19/46* (2014.01)
  (Continued)

(52) U.S. Cl.
  CPC ....... *H04N 19/00545* (2013.01); *H04N 19/44* (2014.11); *H04N 19/46* (2014.11); *H04N 19/513* (2014.11); *H04N 21/2365* (2013.01); *H04N 21/234363* (2013.01); *H04N 21/85* (2013.01); *H04N 21/8549* (2013.01); *H04N 19/70* (2014.11)

(58) Field of Classification Search
  CPC .. H04N 19/00545; H04N 19/44; H04N 19/46; H04N 19/513; H04N 19/70; H04N 21/234363; H04N 21/2365; H04N 21/85; H04N 21/8549
  See application file for complete search history.

(56) References Cited

U.S. PATENT DOCUMENTS

| | | | |
|---|---|---|---|
| 5,691,768 A | 11/1997 | Civanlar et al. | |
| 6,356,921 B1 * | 3/2002 | Kumar | G06F 17/30905 348/E7.071 |

(Continued)

FOREIGN PATENT DOCUMENTS

| | | |
|---|---|---|
| DE | 10208480 | 9/2003 |
| KR | 20120138940 | 12/2012 |
| KR | 1264667 | 5/2013 |

OTHER PUBLICATIONS

Office Action received for Korean Patent Application No. 2014-0087805, dated May 22, 2015, 11 pages including 5 pages English translation.

(Continued)

*Primary Examiner* — Thai Tran
*Assistant Examiner* — Christopher T Braniff

(57) ABSTRACT

Various embodiments are generally directed to techniques for incorporating full-resolution frames in a coding order and corresponding thumbnail images of a motion video into compressed video data. A device to compress video frames includes a processor component; and a compression component for execution by the processor component to intersperse at least one compressed thumbnail frame (T-frame) among multiple compressed full-resolution frames of a motion video arranged in a coding order in a compressed video data, the T-frame comprising multiple thumbnail images of the motion video in compressed form. Other embodiments are described and claimed.

23 Claims, 16 Drawing Sheets

(51) Int. Cl.
*H04N 19/513* (2014.01)
*H04N 19/70* (2014.01)
*H04N 21/2343* (2011.01)
*H04N 21/2365* (2011.01)
*H04N 21/85* (2011.01)
*H04N 21/8549* (2011.01)

(56) References Cited

U.S. PATENT DOCUMENTS

| | | | |
|---|---|---|---|
| 7,773,750 B2* | 8/2010 | Pedlow, Jr. | H04L 63/0428 380/212 |
| 2002/0166122 A1 | 11/2002 | Kikinis et al. | |
| 2003/0035543 A1* | 2/2003 | Gillon | H04N 7/1675 380/270 |
| 2004/0095396 A1 | 5/2004 | Stavely et al. | |
| 2006/0050790 A1* | 3/2006 | Eerenberg | H04N 19/30 375/240.24 |
| 2010/0186035 A1* | 7/2010 | Song | G11B 27/34 725/40 |
| 2012/0072955 A1 | 3/2012 | Cho et al. | |
| 2012/0195365 A1* | 8/2012 | Horowitz | H04N 19/70 375/240.02 |
| 2013/0307942 A1* | 11/2013 | Dini | H04N 5/44591 348/51 |

OTHER PUBLICATIONS

Extended European Search Report received for European patent Application No. 14176703.8, dated Oct. 16, 2014 7 pages.

Smith et al., "Informative Annex on Extraction and Use of MDS Tools (Contribution Part 6 to Software)", MPEG Meeting; International Organization for Standardization, ISO/IEC JTC 1/SC 29/WG 11, Coding of Moving Pictures and Audio, Jul. 2001, Sydney, 76 pages.

Wang et al., "HLS: Thumbnail Support in HEVC", Joint Collaborative Team on Video Coding (JCT-VC) of ITU-T SG 16 WP 3 and ISO/IEC JTC 1/SC 29/WG 11, Vienna, AT, Jul. 25-Aug. 2, 2013, 7 pages.

Office Action received for European Patent Application No. 14176703.8, dated Aug. 11, 2016, 6 pages.

* cited by examiner

TECHNIQUES FOR INCLUSION OF THUMBNAIL IMAGES IN COMPRESSED VIDEO DATA

BACKGROUND

Various types of video compression are typically employed in both the storage and transmission of compressed video data that represents motion video. Among those types of video compression are versions of the widely used Motion Picture Experts Group (MPEG) specification promulgated by the International Organization for Standardization of Geneva, Switzerland. Specifically, versions of MPEG known widely as MPEG 2 and MPEG 4 (also known as H.264) have been widely adopted for use in transmitting motion video via satellite, through over-the-air and cable-based distribution systems, and as streamed data via networks (e.g., the Internet). Currently under development is a new version of MPEG known among its developers as high-efficiency video coding ("HEVC") or "H.265" that updates various aspects of MPEG to better address the commonplace adoption of "high definition" television resolutions.

The widespread adoption of such types of video compression has gone hand in hand with the development of new generations of viewing devices able to support new features, including the use of thumbnail images to provide previews of motion videos and/or a visual index of portions of a motion video. Thumbnail images are typically reduced-sized versions of at least some of the full-resolution frames of a motion video, often having a resolution of only up to 200×200 pixels, versus the now commonplace 1920×1080 pixels of full-resolution frames. It is also common for thumbnail images to have a lesser per-pixel color depth than their counterpart full-resolution frames (e.g., 8 bits per pixel for a thumbnail image versus 16 or 24 bits per pixel for a full-resolution frame).

Their lesser resolution and/or color depth result in thumbnail images having a considerably smaller data size than corresponding full-resolution frames depicting the same image such that visually presenting thumbnail images could be significantly less processor-intensive than visually presenting full-resolution frames. Unfortunately, it has become commonplace to employ types of compression (e.g., MPEG 2, MPEG 4, etc.) and implementations of compression coder-decoder (CODEC) hardware and/or software that supports only a single resolution such that only full-resolution frames are typically transmitted or stored. As a result, viewing devices currently must derive thumbnail images by first decompressing and/or decrypting corresponding full-resolution frames, and then downscaling those full-resolution frames to create the thumbnail images.

Thus, viewing devices are denied the potential benefits of reduced processing demands that the smaller data size of thumbnail images could provide. This can become a significant issue for portable viewing devices that rely upon a battery for electric power, since higher processing demands typically lead to higher rates of power consumption.

DETAILED DESCRIPTION

Figure 1:
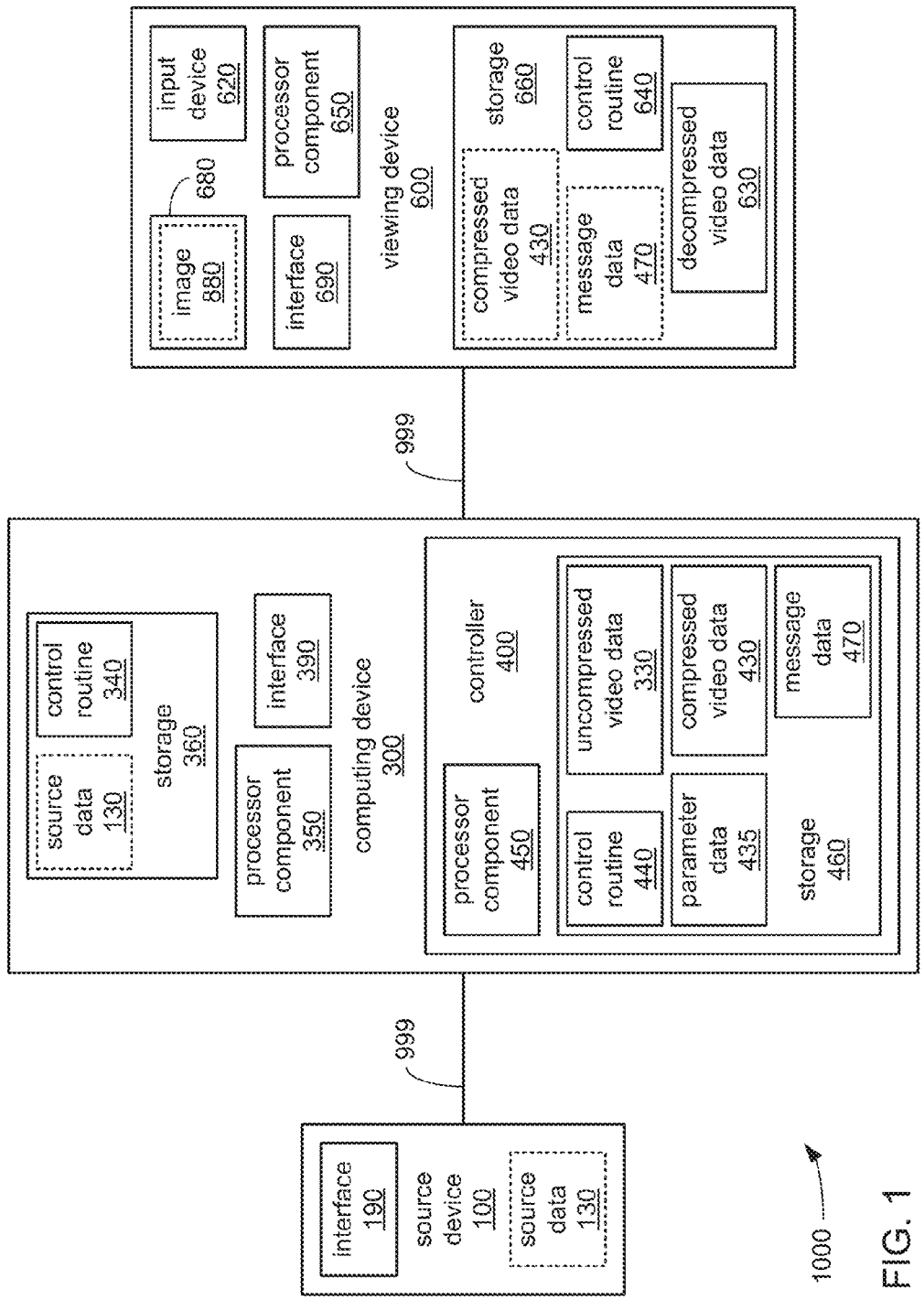
FIG. 1 illustrates an embodiment of a video presentation system.

Various embodiments are generally directed to techniques for incorporating full-resolution frames in a coding order and corresponding thumbnail images of a motion video into compressed video data. The inclusion of both the full-resolution frames and corresponding thumbnail images enables a viewing device to selectively decompress one or the other depending on which is to be visually presented. Thus, the viewing device is able to visually present the thumbnail images without decompressing the full-resolution images, thereby avoiding the higher processing requirements and rate of power consumption associated therewith.

Sets of multiple thumbnail images are combined to form multi-thumbnail frames that are compressed and then interspersed among the full-resolution frames. The full-resolution frames are arranged in a coding order to form a series of full-resolution frames that provides a visual presentation of motion video when decompressed and visually presented in chronological that order. In contrast to the full-resolution frames, the sets of thumbnail images within each multi-thumbnail frame may remain in chronological order. Message data associated with the compressed video data is generated during compression of at least the full-resolution frames and includes messages indicating parameters of the full-resolution frames in their compressed form to enable their decompression and/or decryption. The message data may be augmented to additionally include messages indicating parameters of the multi-thumbnail images in their compressed form.

In some embodiments, a version of MPEG or similar type of compression may be employed to compress at least the full-resolution frames. In such embodiments, a series of full-resolution frames may be compressed to generate a combination of compressed full-resolution frames such as intra-frames (I-frames), predicted frames (P-frames) and/or bi-predicted frames (B-frames) organized into a group-of-pictures (GOP). The video data may incorporate a series of numerous GOPs, and those GOPs may be organized in chronological order while the compressed full-resolution frames inside each GOP are arranged in coding order. The same version of MPEG may also be employed to compress the multi-thumbnail frames to generate compressed thumbnail frames (T-frames), and each GOP may further incorporate one or more of the T-frames interspersed among the I-frame, P-frames and B-frames generated from the compression of the full-resolution frames.

The message data associated with the video data may include messages that identify which of the compressed frames in each GOP are compressed full-resolution frames and which are T-frames. There may be messages that specify parameters for the compressed full-resolution frames and/or the T-frames, such as pixel resolution, color depth, color encoding, a number of frames per second for visual presentation, or which compressed frames are also encrypted and which are not. There may also be messages that specify an interval at which T-frames are located among the compressed frames of the video data, the location of the T-frames within each GOP, and/or the number of thumbnail images included within each T-frame.

In some embodiments, the multi-thumbnail frames are compressed entirely independently of the full-resolution frames such that no resulting T-frame describes its pixel color values with reference to a compressed form of any of the full-resolution frames. Thus, each T-frame may be compressed as an intra-frame such that its pixel color values are not described with reference to any other frame, including another T-frame. Alternatively, a subset of the T-frames may be predicted frames and/or bi-predicted frames in which their pixel color values are described with reference to one or more other T-frames.

In some embodiments, the T-frames may be interspersed among the compressed full-resolution frames and/or the messages associated with the T-frames may be incorporated into the message data in a manner that adheres to a widely accepted standard for a type of compression as optional features (e.g., as an optional extension to a version of MPEG, such as HEVC). More specifically, the inclusion of the T-frames in the compressed video data and/or the messages associated with the T-frames in the message data may be performed in a manner that enables their decompression and subsequent use to be optional. Thus, some viewing devices configured to decompress motion video in accordance with such a standard may entirely ignore the T-frames, and decompress only the compressed full-resolution frames, while other viewing devices may additionally decompress the T-frames.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a video presentation system 1000 incorporating one or more of a source device 100, a computing device 300 and a viewing device 600. In the video presentation system 1000, full-resolution frames and corresponding thumbnail images representing a motion video 880 that may be received from the source device 100 are compressed by the computing device 300 and are then provided to the viewing device 600 to be visually presented on a display 680. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 600 exchange signals conveying motion video and/or related data through a network 999. However, one or more of these computing devices may exchange other data entirely unrelated to visual imagery with each other and/or with still other computing devices (not shown) via the network 999. In various embodiments, the network may be a single network that may be limited to extending within a single building or other relatively limited area, a combination of connected networks that may extend a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the source device 100 (if present) incorporates an interface 190 to couple the source device 100 to the computing device 300 to provide the computing device 300 with the motion video 880 in the form of a source data 130. As depicted, the interface 190 may couple the source device 100 to the computing device 300 through the same network 999 as couples the computing device 300 to the viewing device 600. However, in other embodiments, the source device 100 may be coupled to the computing device 300 in an entirely different manner. The source data 130 may represent the motion video 880 in a compressed form employing any of a variety of compression techniques familiar to those skilled in the art.

In various embodiments, the computing device 300 incorporates one or more of a processor component 350, a storage 360, a controller 400 and an interface 390 to couple the computing device 300 to the network 999. The storage 360 stores one or more of the source data 130 and a control routine 340. The controller 400 incorporates one or more of a processor component 450 and a storage 460. The storage 460 stores one or more of uncompressed video data 330, compressed video data 430, parameter data 435, message data 470 and a control routine 440.

The control routine 340 incorporates a sequence of instructions operative on the processor component 350 in its role as a main processor component of the computing device 300 to implement logic to perform various functions. In executing the control routine 340 in some embodiments, the processor component 350 may receive the source data 130 representing the motion video 880 from the source device 100, and may store at least a subset thereof in the storage 360. It should be noted that the source data 130 may be stored in the storage 360 for a considerable amount of time before any use is made of it, including transmission of the motion video 880 that it represents to the viewing device 600 for visual presentation. Where the source data 130 is received in compressed form, the processor component 350 may decompress it. The processor component 350 then provides at least full-resolution frames of the source data 130 to the controller 400 as the uncompressed video data 330 to be compressed for provision to the viewing device 600. The processor component 350 may also provide thumbnail images that correspond to at least some of the full-resolution frames to the controller 400 as more of the uncompressed video data 330.

Alternatively, in executing the control routine 340 in other embodiments, the processor component 350 generates at least a portion of the motion video 880. In such other embodiments, the motion video 880 may include computer-generated imagery (CGI) that is authored or otherwise compiled using the computing device 300. Alternatively or additionally, the motion video 880 may include a visual portion of a user interface, such as selectable items represented graphically and/or a graphical pointer. The processor component 350 provides at least full-resolution frames of such generated motion video to the controller 400 as the uncompressed video data 330. The processor component 350 may also provide thumbnail images that correspond to at least some of the full-resolution frames to the controller 400 as more of the uncompressed video data 330.

In some embodiments, the processor component 350 and/or 450 may generate the thumbnail images where the thumbnail images are not otherwise provided. Where motion video 880 is received by the computing device 300 as the source data 130, the processor component 350 and/or the 450 may generate thumbnail images from the full-resolution frames within the source data 130. Alternatively or additionally, where the processor component 350 generates the full-resolution frames of the motion video 880, but does not generate corresponding thumbnail images, the processor component 450 may generate those thumbnail images from those full-resolution frames.

The control routine 440 incorporates a sequence of instructions operative on the processor component 450 in its role as a controller processor component of the controller 400 of the computing device 300 to implement logic to perform various functions. In executing the control routine 440, the processor component 450 combines sets of the thumbnail images of the uncompressed video data 330 into multi-thumbnail frames. The processor component 450 then compresses those multi-thumbnail frames to generate compressed thumbnail frames (T-frames) in addition to compressing the full-resolution frames of the uncompressed video data 330 to generate compressed full-resolution frames. The processor component 450 then stores the resulting T-frames and compressed full-resolution frames as the compressed video data 430.

Where the type of compression employed in compressing the full-resolution frames and the multi-thumbnail frames includes a version of MPEG or a similar type of video compression (e.g., VC1 promulgated by Microsoft® Corporation of Redmond, Wash., or either VP8 or VP9 promulgated by Google® Inc. of Mountain View, Calif.), then the processor component 450 may additionally organize the compressed full-resolution frames and the T-frames into groups-of-pictures (GOPs). As familiar to those skilled in the art, the first compressed frame of a GOP is typically an I-frame of a type that is never preceded chronologically by other frames that reference its pixel color values in describing their own. Stated differently, each GOP is typically started by an I-frame where only subsequent P-frames or B-frames use it as a reference. Such I-frames are frequently referred to as instantaneous decoder refresh frames (IDR frames) or random access pictures (RAPs).

Figure 3:
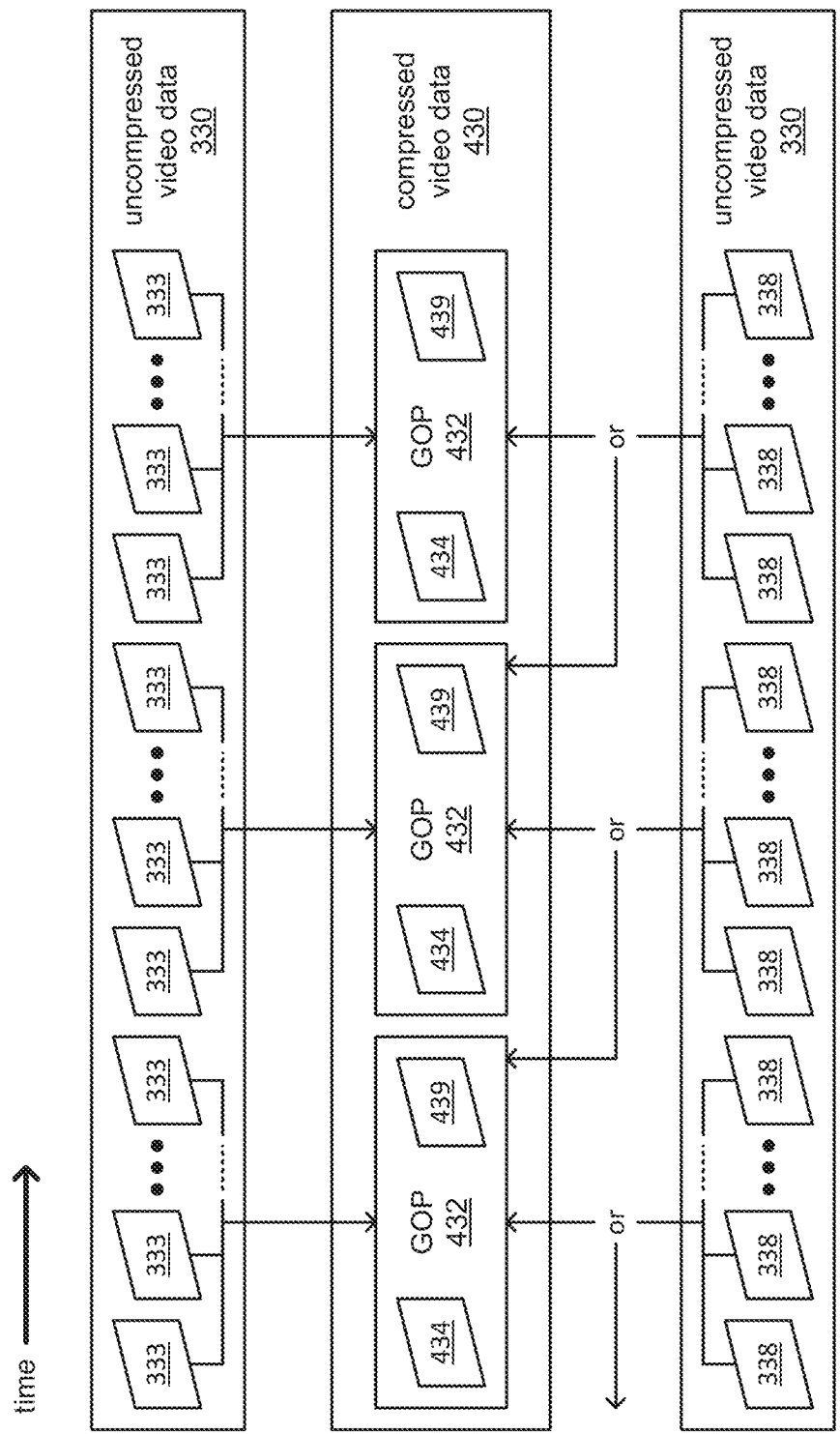
FIGS. 3-5 each illustrate an example of generating a compressed video data according to an embodiment.

FIG. 3 illustrates an example embodiment of generating the compressed video data 430 from full-resolution frames 333 and thumbnail images 338 of the uncompressed video data 330. It should be noted that the frames and images of the uncompressed video data 330 are arranged left-to-right in the chronological order in which they may have been captured by a motion video camera and in which they would normally be visually presented to view the motion video 880. Further, corresponding ones of the full-resolution frames 333 and the thumbnail images 338 (e.g., ones of the full-resolution frames 333 and ones of the thumbnail images 338 that correspond in that they are of the same image) are vertically aligned in this chronological ordering.

As depicted, a type of compression that entails the generation of GOPs is employed (e.g., a version of MPEG) such that the compressed video data 430 is made up of a series of GOPs 432, where each of the GOPs 432 corresponds to a set of the full-resolution frames 333. The compressed full-resolution frames within each of the GOPs 432 may be organized in a coding order in which compressed full-resolution frames that are used as reference frames by other compressed full-resolution frames precede those other compressed full-resolution frames. As familiar to those skilled in the art, this is typically done to enable decompression to be performed at a relatively steady rate in which there is never an instance of the decompression of one frame having to be delayed until another frame is received by whatever device that performs the decompression. In contrast, the GOPs 432 themselves are typically organized in chronological order.

Each of the GOPs 432 is depicted as starting with an IDR frame 434 and ending with at least one T-frame 439. For sake of avoiding visual clutter, the other compressed full-resolution frames (e.g., the I-frames, P-frames and B-frames) of each of the GOPs 432 are not depicted. As previously discussed, it is typical for the first compressed frame of each GOP 432 to be an IDR frame 434 such that no other compressed frame that precedes it chronologically uses it as a reference. This avoids situations in which P-frames or B-frames of one of the GOPs 432 employ an I-frame of a chronologically subsequent one of the GOPs 432 as a reference. It should be noted that the IDR frame 434 is the first compressed full-resolution frame in each GOP both chronologically and in coding order. Thus, whether the compressed frames of a given GOP are organized into chronological or coding order such that the other compressed full-resolution frames may occupy different positions within that GOP, the same IDR frame 434 occupies the first position.

As also depicted, the thumbnail images 338 that correspond to a set of the full-resolution frames 333 associated with one of the GOPs 432 may be combined and compressed into one or more T-frames that are included in that same one of the GOPs 432, or that are included in a chronologically earlier one of the GOPs 432. The choice of one or the other may be determined by the manner in which the thumbnail images 338 are expected to be used by the viewing device 600. For example, where it is expected that the thumbnail images 338 may be employed to provide a visual index of portions of the motion video 880, placement of thumbnail images 338 in an earlier GOP 432 may enable the later GOP(s) 432 that include the compressed forms of the corresponding full-resolution frames 333 to be requested and/or received for decompression only when needed.

Figure 4:
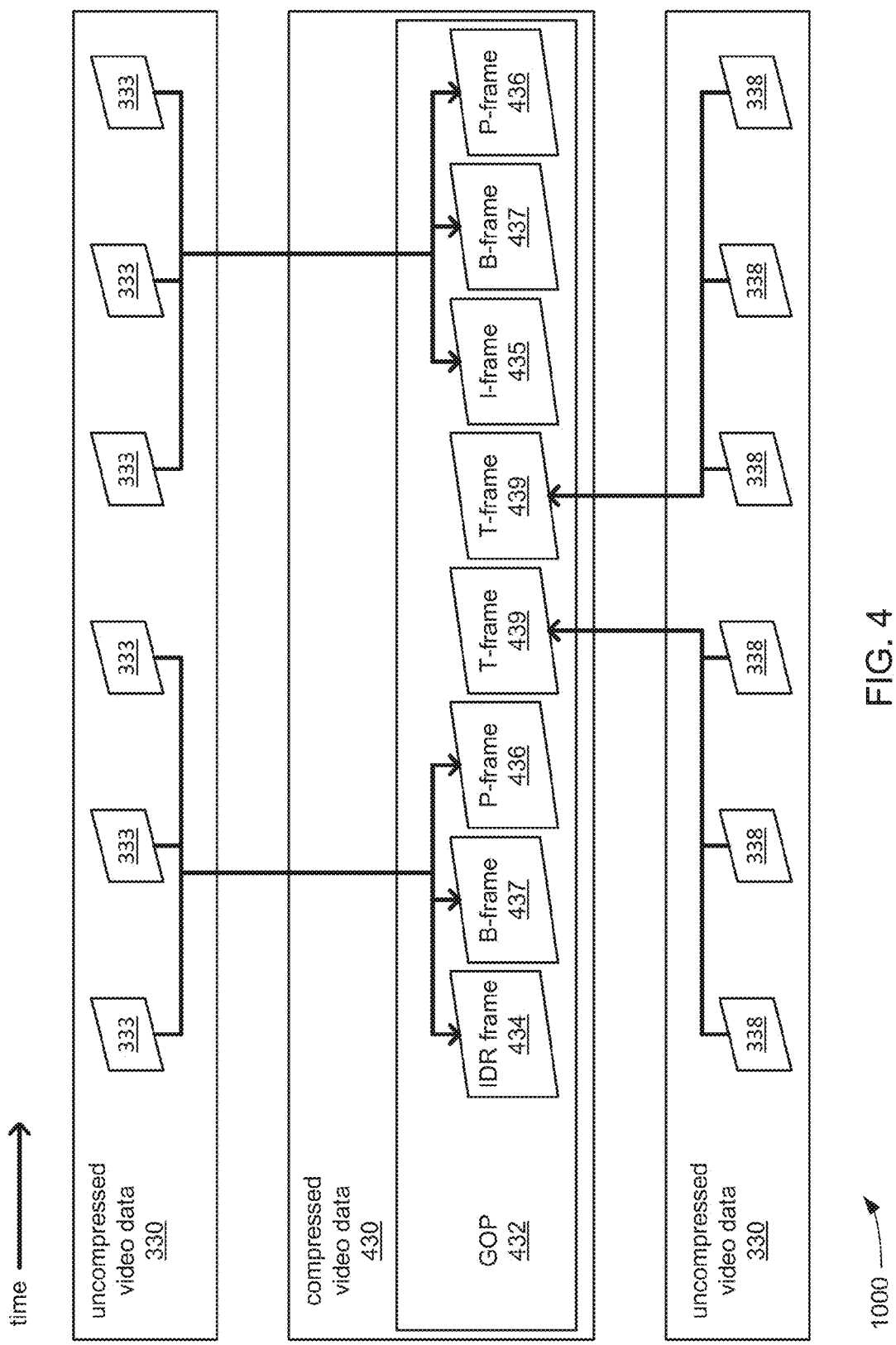

FIG. 4 illustrates an example embodiment of generating a single GOP 432 of the compressed video data 430 from the uncompressed video data 330 in somewhat greater detail than FIG. 3. In particular, an example of a series of I-frames 435, P-frames 436 and B-frames 437 of the GOP 432 generated from the compression of a set of full-resolution frames 333 associated with that GOP 432 is depicted. It should be noted that this particular depiction of a series of compressed full-resolution frames is a somewhat simplified depiction to facilitate discussion and understanding, and that it is generally expected that the GOP 432 would typically incorporate a larger series of compressed full-resolution frames including a greater number of the I-frames 435, P-frames 436 and B-frames 437.

Like FIG. 3, the frames and images of the uncompressed video data 330 are also arranged in series in chronological order (depicted as progressing left-to-right) in FIG. 4, with corresponding ones of the full-resolution frames 333 and the thumbnail images 338 vertically aligned in chronological order. Also like FIG. 3, the compressed full-resolution frames, specifically the IDR frame 434, I-frames 435, P-frames 436 and B-frames 437, are organized within the GOP 432 in coding order.

As depicted, the thumbnail images 338 are combined and compressed into T-frames 439 that are included in the same GOP 432 as the full-resolution images 333 to which they correspond. It should be noted that the quantity of T-frames 439 interspersed among the compressed full-resolution frames (e.g., the IDR frame 434, the I-frames 435, the P-frames 436 and/or the B-frames 437) may vary from one of the GOPs 432 of the compressed video data 430 to another depending at least on how many of the thumbnail images 338 are to be included in each of the GOPs 432.

As also depicted, the T-frames 439 are interspersed among the compressed full-resolution frames in a manner in which the T-frames 439 are grouped together and positioned roughly in the middle of the series of compressed full-resolution frames. However, it should be noted that multiple T-frames 439 need not be so grouped together, and may be positioned separately or grouped at any location within the GOP 432.

Figure 5:
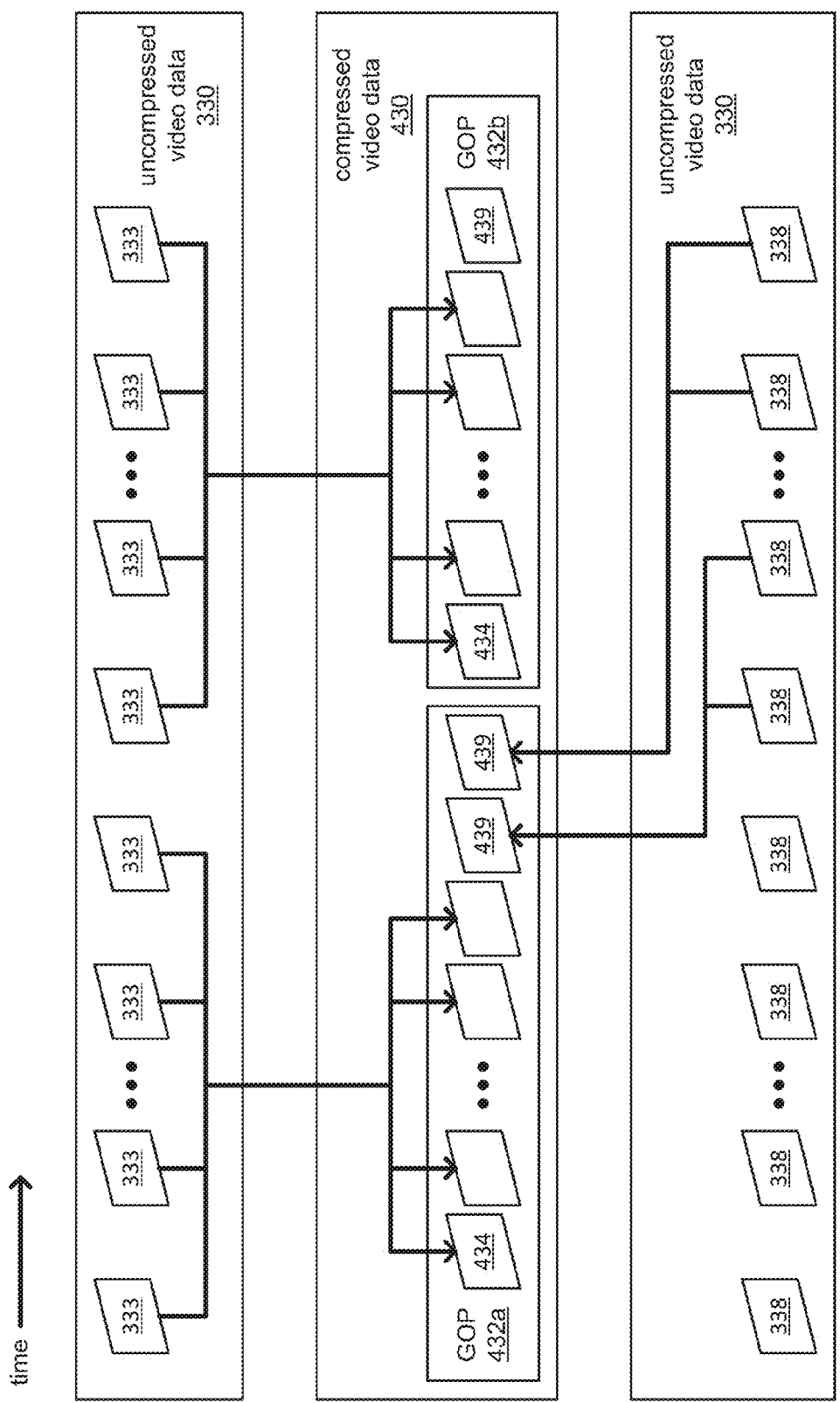

FIG. 5 illustrates an example embodiment of generating multiple GOPs 432a and 432b of the compressed video data 430 from the uncompressed video data 330 in somewhat greater detail than FIG. 3. In particular, the generation of series of compressed full-resolution frames for each of the GOPs 432a and 432b from the compression of associated sets of full-resolution frames 333 is depicted. Like FIG. 4, the frames and images of the uncompressed video data 330 are also arranged in chronological order (depicted as progressing left-to-right) in FIG. 4, with corresponding ones of the full-resolution frames 333 and the thumbnail images 338 vertically aligned in chronological order. Also like FIG. 4, the compressed full-resolution frames do not follow the chronological order of the frames and images of the uncompressed video data 330, and may be in coding order.

Unlike the example of FIG. 4, in the example of FIG. 5, the thumbnail images 338 that correspond to the full-resolution frames 333 of GOP 432b are combined and compressed into T-frames 439 that are included in the preceding GOP 432a, rather than in the same GOP 432b. Again, this may be at least partially determined by the use that is expected to be made of the T-frames 439 by the viewing device 600, such as part of a visual index. It should again be noted that the T-frames 439 may be interspersed among the compressed full-resolution frames (e.g., the IDR frame 434 and the other compressed full-resolution frames that follow the IDR frame 434 in each of the GOPs 432a and 432b) either separately or grouped, and at any location within each of the GOPs 432a and 432b.

Thus, referring back to FIGS. 3-5, the compressed full-resolution frames (e.g., the IDR frames 4343, I-frames 435, P-frames 436 and B-frames 437) are organized within each of the depicted GOPs 432 into which they are disposed in coding order, while the GOPs 432 themselves are organized in chronological order. Again, as familiar to those skilled in the art, the coding order of the compressed full-resolution frames arises from efforts to ensure that there is never an instance of the decompression of a frame having to be delayed until another frame that it refers to has been received by a device performing the decompression. Thus, where any one compressed frame employs another compressed frame as a reference, the coding order is generated to ensure that the other compressed frame used as a reference is always received before the compressed frame that refers to it.

The T-frames 439 may be interspersed among the compressed full-resolution frames in a manner that does not correspond to their coding order. Each of the T-frames 439 represents multiple thumbnail images spanning a period of time among them that includes multiples of the compressed full-resolution frames, while each compressed full-resolution frame represents a "snapshot" of a single moment in time. Further, and has been discussed, the T-frames 439 that correspond to compressed full-resolution frames of a GOP 432 that span one period of time may be interspersed among the compressed full-resolution frames of another GOP 432 that spans an earlier period of time.

Returning to FIG. 1, along with generating the compressed video data 430 from the uncompressed video data 330, the processor component 450 also generates the message data 470 associated with the compressed video data 430. The compressed video data 430 includes messages indicating various parameters of portions of the compressed video data 430 to enable the viewing device 600 to decompress the compressed full-resolution frames and the T-frames 439 making up the compressed video data 430.

Some of the messages may indicate parameters that apply to the entirety of the compressed video data 430, such as a rate at which full-resolution frames and/or thumbnail images should be visually presented by the viewing device 600 after decompression to enable proper viewing of motion in the motion video 880. Some of the messages may indicate parameters that apply to individual GOPs 432, such as the quantity and/or location(s) of compressed full-resolution frames and/or of the T-frames 439 within one or more particular GOPs 432. Some of the messages may indicate parameters that apply to individual ones of the compressed full-resolution frames and/or the T-frames 439, such as pixel resolution and/or color depth of each such frame, the quantity of thumbnail images 338 represented in a particular T-frame 439, and/or an interval specified as a number of compressed frames at which IDR frames 434 and/or T-frames 439 may be found.

Figure 6:
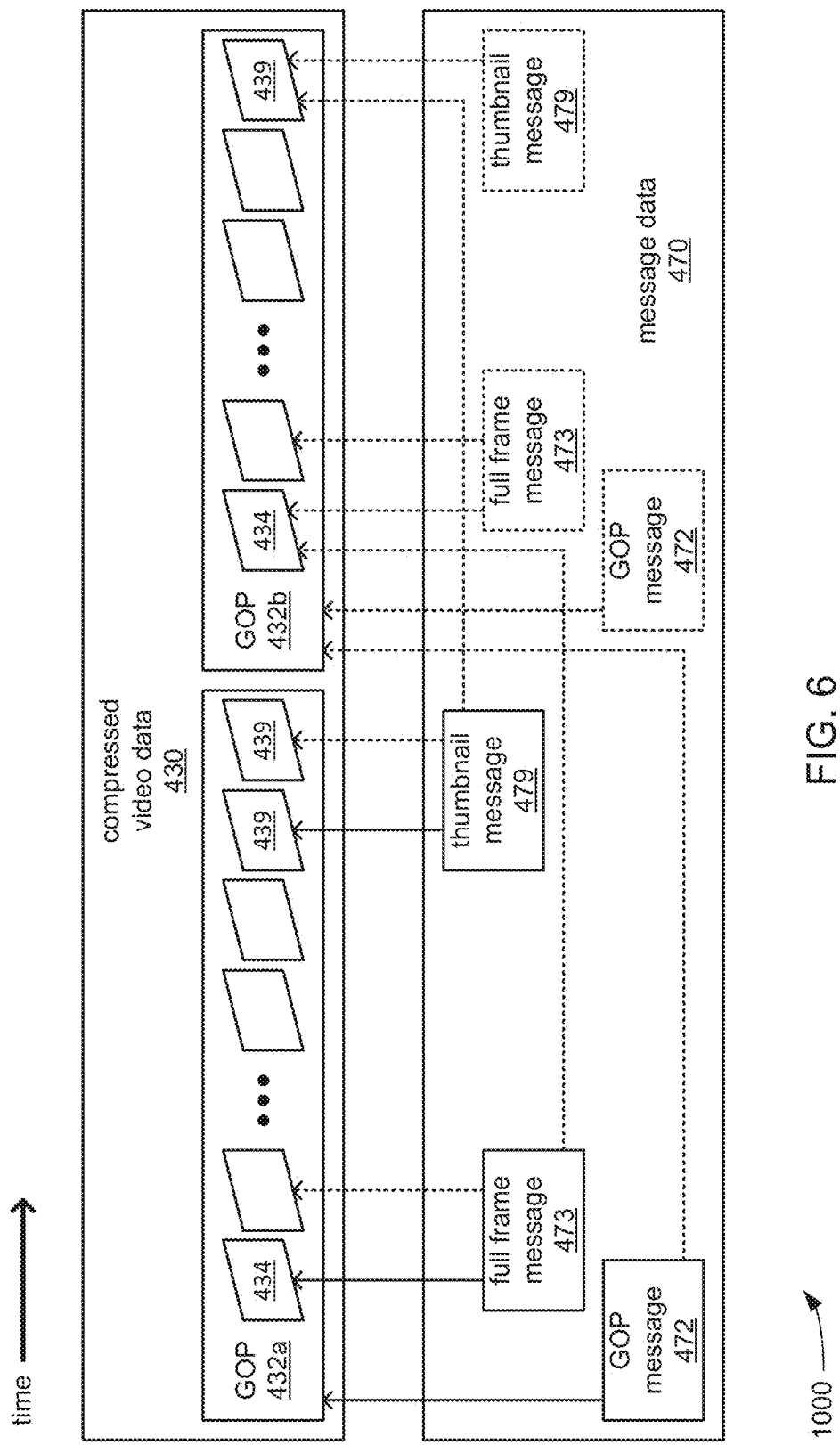
FIG. 6 illustrates an example of generating a compressed video data and a message data according to an embodiment.

FIG. 6 illustrates an example embodiment of the compressed video data 430 that includes at least GOPs 432a and 432b, and the message data 470 associated therewith. As depicted, each of the GOPs 432a and 432b start with a single IDR frame 434 and end with at least one T-frame 439. As also depicted, the message data 470 may include one or more GOP messages 472, one or more full frame messages 473, and/or one or more thumbnail messages 479. The messages of the message data 470 may be implemented in any of a variety of forms including and not limited to human-readable text or machine-readable code.

One GOP message 472 may provide an indication of a parameter that applies to the GOP 432a, such as an indication of the quantity and/or type(s) of compressed frames within the GOP 432a. Alternatively, the same GOP message 472 may also apply to the GOP 432b and/or a separate GOP message 472 may apply to the GOP 432b. Similarly, one full frame message 473 may provide an indication of a parameter that applies to one of the compressed full-resolution frames of the GOP 432a (e.g., the IDR frame 434 at the start of the GOP 432a), such as an indication of pixel resolution or color depth of that one compressed full-resolution frame. Alternatively, the same full frame message 473 may also apply to one or more other compressed full-resolution frames in the GOP 432a and/or one or more full-resolution frames in the GOP 432b. Further, one thumbnail message 479 may provide an indication of a parameter that applies to one of the T-frames 439 of the GOP 432a (e.g., one of the two depicted T-frames 439 at the end of the GOP 432a), such as an indication of pixel resolution or color depth of that one T-frame 439. Alternatively, the same thumbnail message 479 may also apply to one or more other T-frames 439 in the GOP 432a and/or one or more T-frames 439 in the GOP 432b.

Figure 7:
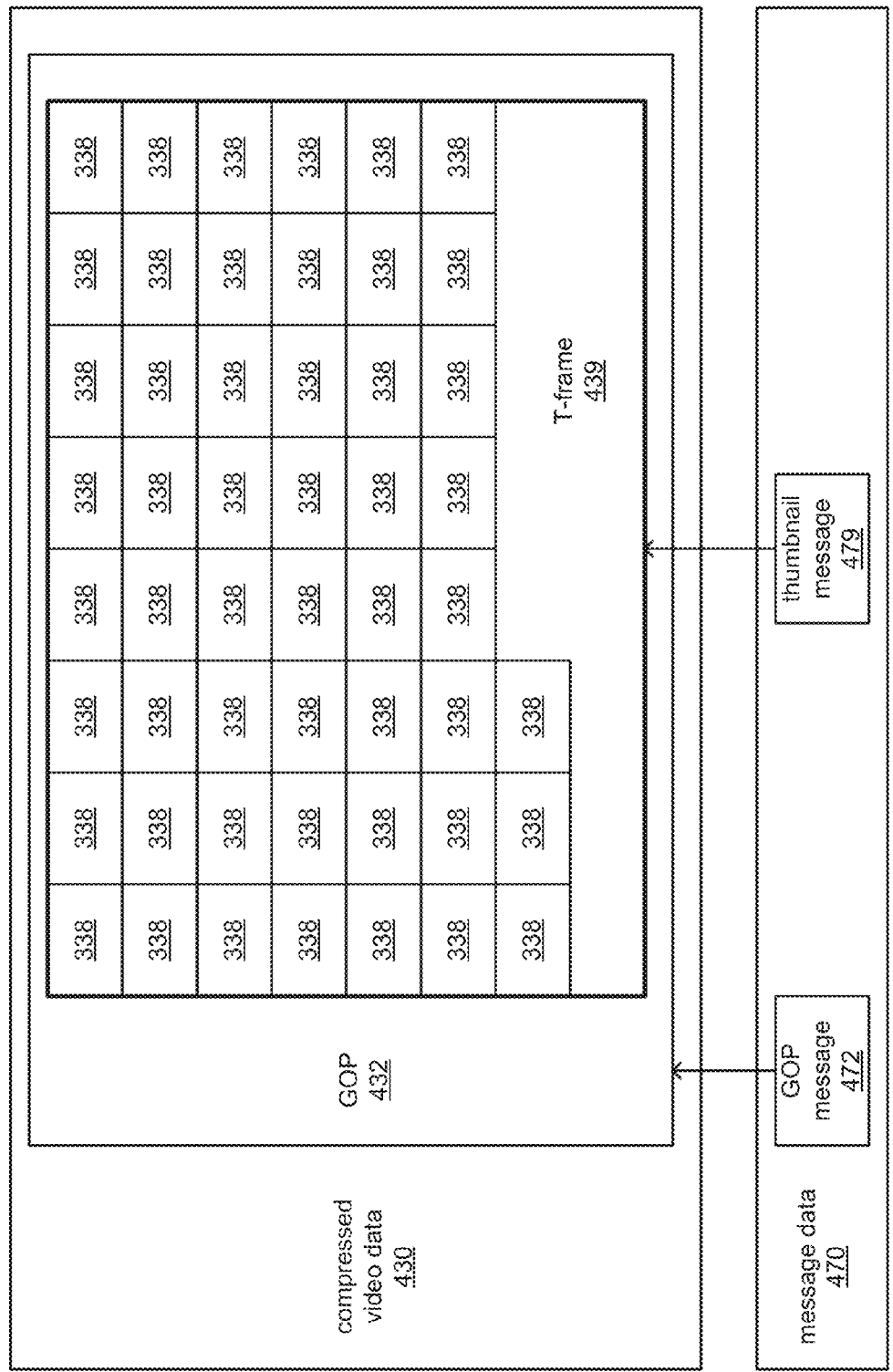
FIG. 7 illustrates an example of an organization of thumbnail images in compressed video data according to an embodiment.

FIG. 7 illustrates an example of an embodiment of a T-frame 439 within a GOP 432 of the compressed video data 430, and the message data 470 associated therewith in somewhat greater detail than FIG. 6. In particular, an example of the manner in which pixel data of a number of thumbnail images 338 may be organized within a T-frame 439 is depicted. It should be noted that although the thumbnail images 338 are shown as organized in a tiled manner within the depicted T-frame 439, other embodiments are possible in which the pixel data of those thumbnail images 338 may be organized in any of a variety of ways within a T-frame 439.

Further, the depicted T-frame 439 may be associated with a thumbnail message 479 indicating a parameter of the T-frame 439, such as the quantity of thumbnail images 338 represented by the T-frame 439, the pixel resolution of those thumbnail images 338, a color depth, etc. It should be noted that although the T-frame 439 may be interspersed among compressed full-resolution frames, the T-frame 439 may have a different pixel resolution and/or different color depth from those compressed full-resolution frames, and these may be indicated in the thumbnail message 479.

Returning to FIG. 1, in generating the compressed video data 430 and the accompanying message data 470 from the uncompressed video data 330, the processor component 450 may employ various parameters specified in the parameter data 435. Such parameters may control aspects of whatever entropy encoding, quantization, discrete cosine transform and/or motion compensation may be performed during compression. Alternatively or additionally, such parameters may specify a number of compressed frames per GOP, a minimum or maximum resolution and/or color depth per compressed frame, etc.

Following the generation of the compressed video data 430 and the accompanying message data 470 from the uncompressed video data 330, the processor component 350 and/or 450 provides the compressed video data 430 and accompanying message 470 to the viewing device 600. In some embodiments, the processor component 350 and/or 450 may transmit the compressed video data 430 and/or the message data 470 to the viewing device 600 via the network 999. In other embodiments, the processor component 350 and/or 450 may store the compressed video data 430 and/or the message data 470 onto a removable medium (not shown) that may subsequently be used to convey both pieces of data to the viewing device 600.

The viewing device 600 incorporates one or more of a processor component 650, a storage 660, an input device 620, and an interface 690 to couple the viewing device 600 to the network 999. The viewing device 600 may also incorporate a display 680 on which to visually present the motion video 880, or the display 680 may be physically separate from the viewing device 600, but communicatively coupled thereto. The input device 620 may be any of a variety of manually-operable input devices by which an operator of the viewing device 600 may convey commands to select what is visually presented by the viewing device 600 on the display 680. For example, the input device 620 may include manually-operable controls carried by a casing of the viewing device 600, itself, and/or may include manually-operable controls carried by a remote control wirelessly coupled to the viewing device 600. The storage 660 stores one or more of the compressed video data 430, the message data 470, a control routine 640 and decompressed video data 630.

The control routine 640 incorporates a sequence of instructions operative on the processor component 650 to implement logic to perform various functions. In executing the control routine 640, the processor component 650 receives the compressed frames of the compressed video data 430 and accompanying messages of the message data 470 from the computing device 300, storing at least a subset thereof in the storage 660. Again, these pieces of data may be received via the network 999 or by another mechanism, such as a removable storage medium.

The processor component 650 monitors the input device 620 to receive indications of operation of the input device 620 to convey commands to cause the visual presentation of either full-resolution frames or thumbnail images of the compressed video data 430. In response to those commands, the processor component 650 decompresses one or both of the compressed full-resolution frames (e.g., the IDR frames 434, the I-frames 435, the P-frames 436 and the B-frames 437) or the T-frames 439, and visually presents the resulting decompressed full-resolution frames or decompressed thumbnail images on the display 680.

Where a command is received to visually present the full-resolution frames such that the motion video 880 is commanded to be visually presented for viewing, the processor component 650 employs messages of the message data 470 to identify and decompress the compressed full-resolution frames, storing the resulting decompressed full-resolution frames as the decompressed video data 630. The processor component 650 then visually presents the now decompressed full-resolution frames of the motion video 880 on the display 680 at a rate of frames per second that may also be specified by a message in the message data 470.

In some embodiments, where a predetermined period of time has passed since at least a command was received to visually present a motion video or in response to a command to visually present a preview of the motion video 880, the processor component 650 employs messages of the message data 470 to identify and decompress at least a subset of the T-frames 439, storing the resulting decompressed thumbnail images as the decompressed video data 630. The processor component 650 then visually presents those now decompressed thumbnail images on the display 680 at a rate of frames per second that may also be specified by a message in the message data 470.

Figure 2:
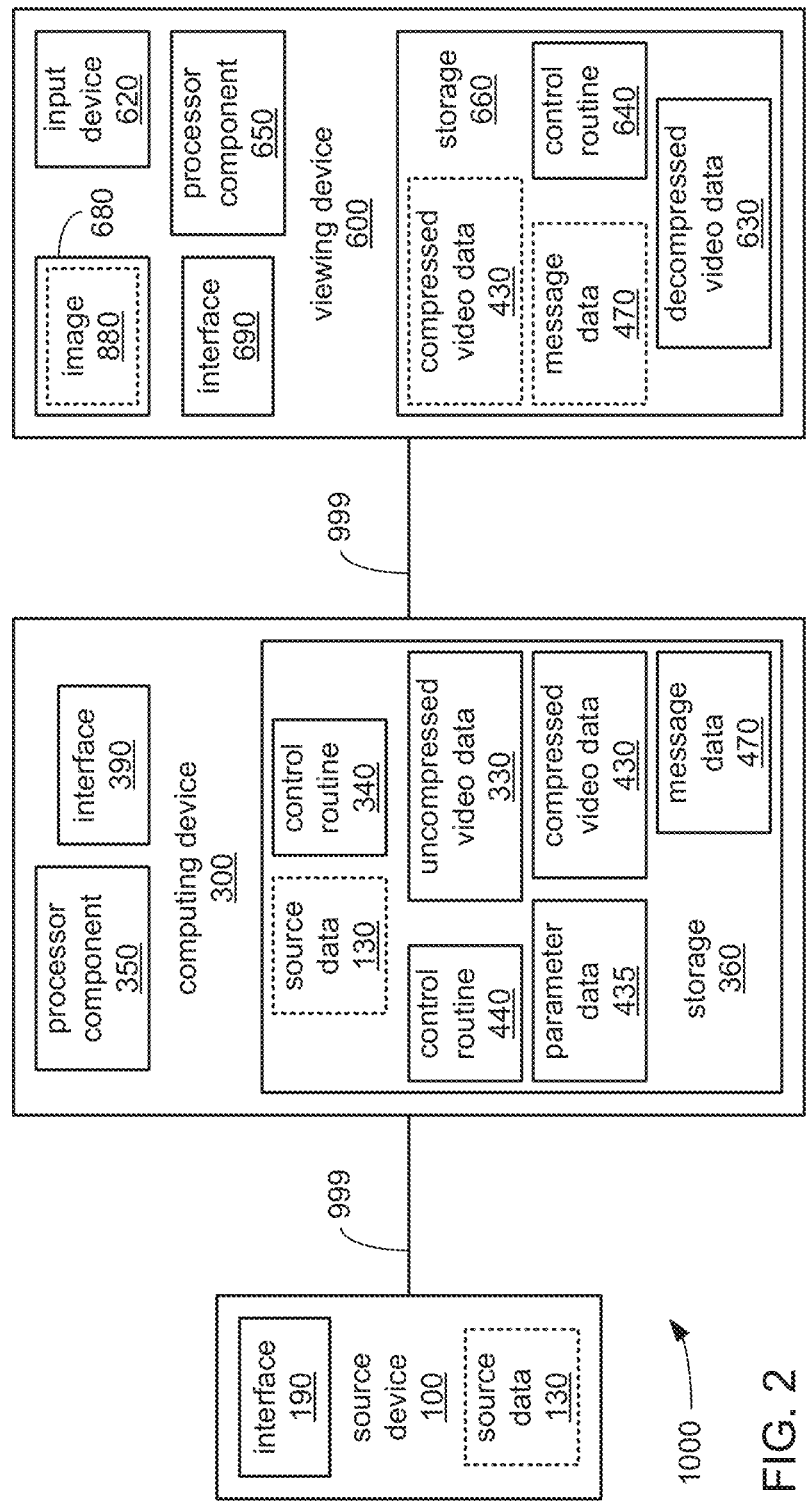
FIG. 2 illustrates an alternate embodiment of a video presentation system.

FIG. 2 illustrates a block diagram of an alternate embodiment of the video presentation system 1000 that includes an alternate embodiment of the computing device 300. The alternate embodiment of the video presentation system 1000 of FIG. 2 is similar to the embodiment of FIG. 1 in many ways, and thus, like reference numerals are used to refer to like elements throughout. However, unlike the computing device 300 of FIG. 1, the computing device 300 of FIG. 2 does not incorporate the controller 400. Also unlike the computing device 300 of FIG. 1, in the computing device 300 of FIG. 2, it is the processor component 350 that executes the control routine 440 in lieu of there being a processor component 450 to do so. Thus, in the alternate embodiment of the video presentation system 1000 of FIG. 2, the processor component 350 may compress the uncompressed video data 330 to generate the compressed video data 430 and the message data 470.

In various embodiments, each of the processor components 350, 450 and 650 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 350, 450 and 650 may include any of a variety of types of processor, it is envisioned that the processor component 450 of the controller 400 (if present) may be somewhat specialized and/or optimized to perform tasks related to graphics and/or video. More broadly, it is envisioned that the controller 400 embodies a graphics subsystem of the computing device 300 to enable the performance of tasks related to graphics rendering, video compression, image rescaling, etc., using components separate and distinct from the processor component 350 and its more closely related components.

In various embodiments, each of the storages 360, 460 and 660 may be based on any of a wide variety of information storage technologies. Such technologies may include volatile technologies requiring the uninterrupted provision of electric power and/or technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EE-PROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 8:
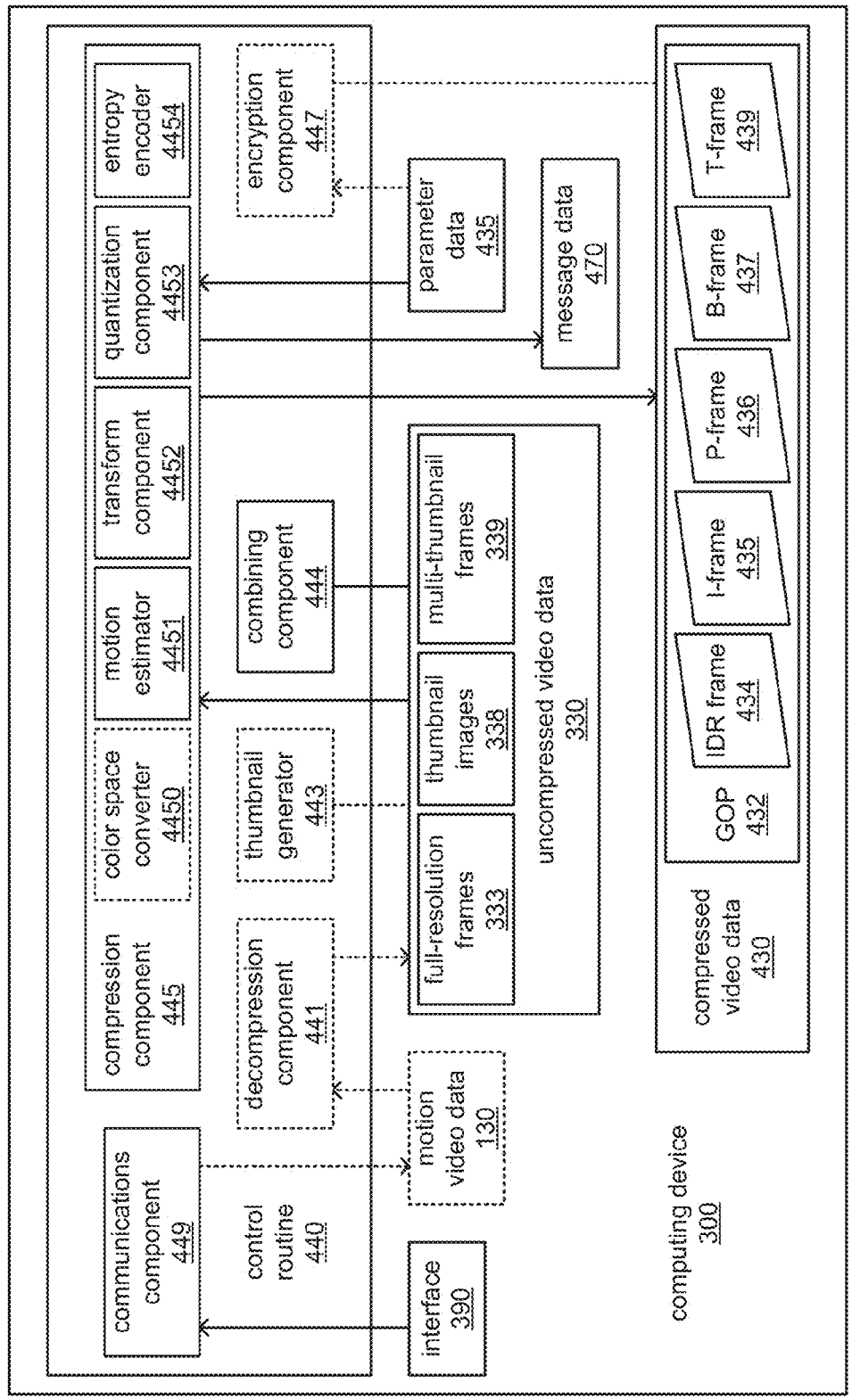
FIGS. 8-9 each illustrate a portion of an embodiment.
Figure 9:
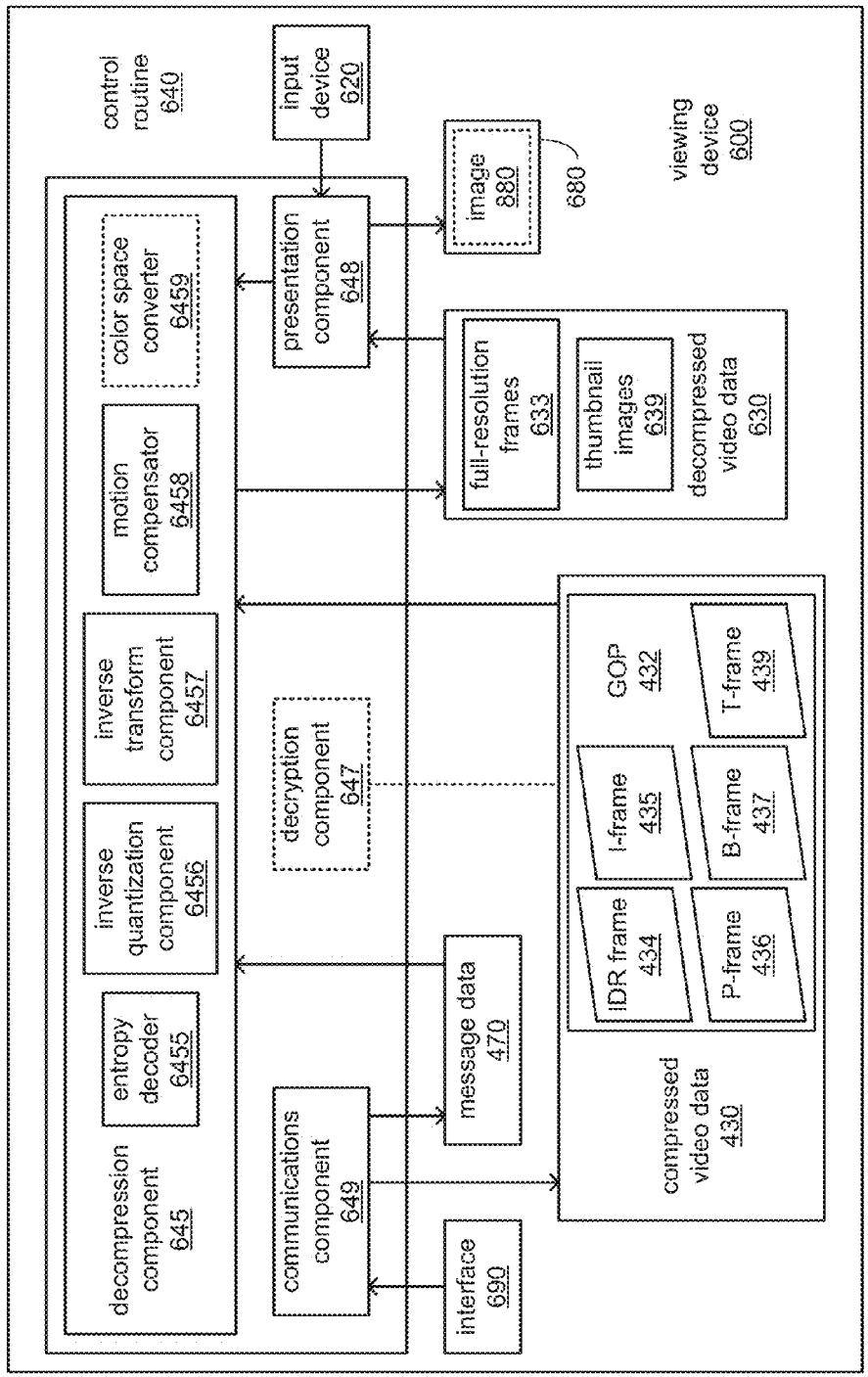

FIGS. 8 and 9 each illustrate a block diagram of a portion of an embodiment of the video presentation system 1000 of FIG. 1 in greater detail. More specifically, FIG. 8 depicts aspects of the operating environment of the computing device 300 in which either the processor component 350 or 450, in executing the control routine 440, combines and compresses the full-resolution frames 333 and corresponding thumbnail images 338 of motion video 880 into the single compressed video data 430. FIG. 9 depicts aspects of the operating environment of the viewing device 600 in which the processor component 650, in executing the control routine 640, selectively decompresses the compressed full-resolution frames and/or the T-frames 439, and visually presents one or both on the display 680. As recognizable to those skilled in the art, the control routines 440 and 640, including the components of which each is composed, are selected to be operative on whatever type of processor or processors that are selected to implement applicable ones of the processor components 350, 450 or 650.

In various embodiments, each of the control routines 340, 440 and 640 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350, 450 or 650. Where one or more device drivers are included, those device drivers may provide support for any of a variety of other components, whether hardware or software components, of corresponding ones of the computing devices 300 or 600, or the controller 400.

The control routines 440 or 640 may include a communications component 449 or 649, respectively, executable by whatever corresponding ones of the processor components 350, 450 or 550 to operate corresponding ones of the interfaces 390 or 690 to transmit and receive signals via the network 999 as has been described. Among the signals received may be signals conveying the source data 130 and/or the compressed video data 430 among one or more of the computing devices 100, 300 or 600 via the network 999. As recognizable to those skilled in the art, each of these communications components is selected to be operable with whatever type of interface technology is selected to implement corresponding ones of the interfaces 390 or 690.

Turning more specifically to FIG. 8, the control routine 440 includes a combining component executable by the processor component 350 or 450 to combine sets of the thumbnail images 338 into multi-thumbnail frames 339. As previously discussed, the full-resolution frames 333, whether received by the computing device 300 from another computing device or generated within the computing device 300, may not be accompanied by the thumbnail images 338. Thus, in some embodiments, the control routine 440 may also include a thumbnail generator 443 executable by the processor component 350 or 450 to generate corresponding thumbnail images 338 for at least some of the full-resolution images 333. In some embodiments, thumbnail generator 443 may generate corresponding thumbnail images 338 for all of the full-resolution images 333.

The control routine 440 includes a compression component 445 executable by the processor component 350 or 450 to compress the uncompressed video data 330 to generate the compressed video data 430. More specifically, the compression component 445 compresses the full-resolution frames 333 of the uncompressed video data 330 to generate compressed full-resolution frames as part of the compressed video data 430. In embodiments in which a version of MPEG or similar type of compression is employed by the compression component 445, the compressed full-resolution frames include at least one IDR frame 434, one or more I-frames 435, one or more P-frames 436, and/or one or more B-frames 437. Along with compressing the full-resolution frames 333, the compression component 445 also compresses the multi-thumbnail frames 339 to generate the T-frames 439 of the compressed video data 430. As has been discussed, the compression component 445 intersperses the T-frames 439 among the compressed full-resolution frames.

Where the type of compression employed is a version of MPEG or similar type of compression, the compression component 445 organizes the compressed full-resolution frames into GOPs 432. More precisely, the compression component 445 selects sets of chronologically adjacent full-resolution frames 333, compresses them to generate corresponding sets of compressed full-resolution frames, and then disposes each of those sets within a separate GOP 432. In so doing, the compression component 445 reorganizes the compressed full-resolution frames of each such set of compressed full-resolution frames from a chronological order to a coding order such that they are organized in coding order within each of the GOPs 432. In contrast, the GOPs 432 themselves are organized in chronological order. Further, an IDR frame 434 is the first frame in the coding order in each GOP 430. The IDR frame 434 in each GOP 430 is then followed by a combination of one or more of each of I-frames 435, P-frames 436, B-frames 437 and T-frames 439. The compression component 445 then intersperses one or more T-frames 439 among the compressed full-resolution frames in at least some of the GOPs 432. As has been discussed, the one or more T-frames 439 in a GOP 432 may be positioned in groups and/or individually anywhere among the compressed full-resolution frames, and the organization of T-frames within a GOP 432 need not follow a chronological order.

Along with generating the compressed video data 430, the compression component 445 also generates the message data 470 made up of messages indicating various parameters of the compressed frames, the GOPs 432 and/or other aspects of the compressed video data 430. The message data 470 is provided to the viewing device 600 along with the compressed video data 430 to enable the viewing device 600 to decompress the compressed frames of the compressed video data 430.

At least where the compression component 445 employs a version of MPEG or similar type of compression, the compression component 445 may include one or more of a color space converter 4450, a motion estimator 4451, a transform component 4452, a quantization component 4453 and an entropy encoder 4454. If present, the color space converter 4450 may convert the color space of the full-resolution frames 333 and/or of the thumbnail images 338 from a red-green-blue (RGB) color space to a luminance-chrominance (YUV) color space often employed in versions of MPEG prior to compression.

The motion estimator 4451 analyzes chronologically adjacent ones of the full-resolution frames 333 to identify differences in pixel color values of corresponding blocks of pixels arising from movement of objects such that sets of pixel color values associated with two-dimensional blocks of pixels shift in a particular direction therebetween. The motion estimator 4451 then determines the direction and extent of such movement to enable at least a portion of one full-resolution frame 333 to be described relative to another at least partially with an indication of a motion vector.

For types of compression such as HEVC (a new version of MPEG currently under development), the motion estimator 4451 may also be caused to analyze differences in pixel color values between blocks of pixels within a single one of the full-resolution frames 333 and/or within a single one the multi-thumbnail frames 339. Multiple thumbnail images 338 may be combined in a single multi-thumbnail frame 339 such that they are organized in a tiled manner, FIG. 7 depicting an example of such tiled organization carried over to a T-frame 439 following compression of such a multi-thumbnail frame 339. Such tiling may be advantageous in enabling analysis of differences between blocks of pixels within a single frame. Unlike earlier versions of MPEG that tended to be limited to blocks of 8×8, 8×16, 16×8 or 16×16 pixels, HEVC allows greater flexibility in specifying the pixel resolution of blocks that are analyzed in motion estimation, thereby potentially enabling those blocks to be defined to correspond to the resolution and/or boundaries of at least some thumbnail images 338. Thus, the compression component 445 may generate T-frames 439 in which motion vectors are used to provide a more compact description of differences between pixels of chronologically adjacent thumbnail images 338 within each of those T-frames 439.

For at least some versions of MPEG and similar types of compression, the transform component 4452 implements a discrete cosine transfer (DCT) to transform pixel color values of frames to a frequency domain. However, for types of compression such as HEVC, the transform component 4452 may implement a discrete sine transform in addition to or in lieu of a DCT.

The quantization component 4463 filters out higher frequency components. Such higher frequency components are often imperceptible in human vision and are therefore often deemed acceptable to eliminate to reduce data size. It is at least this removal of higher frequency components that results in versions of MPEG and similar types of compression being classified as a lossy compression techniques in which at least some of the visual information conveyed in frames is deliberately discarded.

For at least some versions of MPEG and similar types of compression, the entropy encoder 4454 employs Huffman coding to perform entropy encoding according to a code table (not shown) that assigns shorter bit-length descriptors to more frequently occurring data values and longer bit-length descriptors to less frequently occurring data values to reduce the number of bits required to describe the same data values. However, other forms of entropy encoding may be employed as an alternative, including and not limited to arithmetic coding (also commonly referred to as context-adaptive binary arithmetic coding or CABAC).

The control routine 440 may include an encryption component 447 executable by the processor component 350 or 450 to encrypt compressed frames of the compressed video data 430 employing any of a variety of encryption techniques. The encryption component 447 may also encrypt the message data 470. In some embodiments, the encryption component may encrypt the compressed full-resolution frames (e.g., the IDR frames 434, the I-frames 435, the P-frames 436 and the B-frames 437), but refrain from encrypting at least a subset of the T-frames 439. This may be done to enable the viewing device 600 to provide a preview made up of a series of the T-frames 439 without the necessity of performing decryption. In such embodiments, the message data 470 may include messages indicating which compressed frames are encrypted and which are not. Further, it may be that all (or substantially all) of the full-resolution frames are encrypted, while at least a subset of the T-frames 439 are not. Alternatively, it may be that all or substantially all of the T-frames 439 are not encrypted, but the message data 470 may include a message providing an indication to the viewing device 600 that only up to a predetermined number of the T-frames 439 are to be visually presented in any preview of the motion video 880. This may be done to prevent viewing of the entire motion video 880 by viewing the T-frames 439, instead of viewing the compressed full-resolution frames.

As previously discussed, the viewing device 600 may receive the motion video 880 as the motion video data 130 from another computing device, and the frames of the motion video 880 therein may be compressed. Thus, in some embodiments, the control routine 440 may also include a decompression component 441 executable by the processor component 350 or 450 to decompress frames of the video data 130 and generate the uncompressed full-resolution frames 330. The decompression component 441 may employ any of a variety of types of compression, including whatever type is appropriate for decompressing the video data 130.

As has been discussed, upon the generation of at least a portion of the compressed video data 430 and a portion of the message data 470 by the computing device 300, at least portions of both are provided to the viewing device 600. This may be done in transmissions by the computing device 300 to the viewing device 600 via the network 999. In such transmissions, separate channels that may be defined by concurrently transmitted streams of data may be employed in transmitting the compressed video data 430 and the message data 470. Alternatively or additionally, provision of the compressed video data 430 and the message data 470 to the viewing device 600 may be done by storing the compressed video data 430 and the message data 470 onto a removable machine-readable medium from which both are subsequently retrieved by the viewing device 600.

Turning more specifically to FIG. 9, the control routine 640 may include a decryption component 647 executable by the processor component 650 to decrypt the compressed frames of the compressed video data 430, regardless of how the compressed video data 430 and the message data 470 are provided to the viewing device 600. The communications component 647 employs the decryption counterpart to whatever type of encryption is employed by the encryption component 447. The decryption component 647 may also decrypt the message data 470 in embodiments in which the message data 470 may also have been encrypted by the encryption component 447.

The control routine 640 includes a decompression component 645 executable by the processor component 650 to selectively decompress the compressed full-resolution frames and/or the T-frames 439 of the compressed video data 430. As previously discussed, whether the compressed full-resolution frames, the T-frames 439 or both are decompressed may depend on what is indicated in commands received from an operator of the viewing device 600 to be displayed. Where the motion video 880 is selected in those commands to be viewed, the decompression component 645 decompresses the full-resolution frames of the compressed video data 430 (e.g., the IDR frames 434, the I-frames 435, the P-frames 436 and the B-frames 437) to generate decompressed full-resolution frames 633 that the decompression component 645 stores as part of the decompressed video data 630. In so doing, the decompression component 645 employs the decompression counterpart of whatever type of compression is employed by the compression component 445.

Where a preview and/or an index of scenes of the motion video 880 based on thumbnail images is selected in those commands to be viewed, the decompression component 645 decompresses T-frames 439 to generate decompressed thumbnail images 639 that the decompression component 645 stores as part of the decompressed video data 630. As previously discussed, the decompression component 645 employs the same type of decompression to decompress the T-frames 439 as it employs to decompress the compressed full-resolution frames. Despite the use of the same types of compression and decompression, the fact that the full-resolution frames 333 and the thumbnail images 338 are separately compressed to form separate compressed frames enables those thumbnail images to be decompressed without the greater processing demands of decompressing full-resolution frames.

In embodiments in which the decompression component 645 employs a version of MPEG or similar type of compression, the decompression component 645 may include one or more of an entropy decoder 6455, an inverse quantization component 6456, an inverse transform component 6457, a motion compensator 6458 and a color space converter 6459. The entropy decoder 6455 decodes the entropy coding performed by the entropy encoder 4454 during compression, employing Huffman, arithmetic coding or another appropriate type of entropy coding. The inverse quantization component 6456 reverses, to some degree, the elimination of high frequency components performed by the quantization component 4453 during compression. The inverse transform component 6457 employs an inverse of whatever transform was employed by the transform component 4452 to transform pixel color values to the frequency domain during compression. The motion compensator 6458 employs the motion vectors derived by the motion estimator 4451 to describe the direction and distance of shifts in blocks of pixel color values to effect the results of those shifts in generating decompressed frames. The color space converter 6459, if present, may be employed to convert the color space of the decompressed frames from a luminance-chrominance (YUV) color space often employed in MPEG to a red-green-blue (RGB) color space often employed in driving displays.

Further, in embodiments in which the decompression component 645 employs a version of MPEG or similar type of compression, the decompression component may reorganize the coding order in which the compressed full-resolution frames are organized within each GOP 432 as it decompresses those frames. In so doing, the decompression component 645 may then generate or at least organize the decompressed full-resolution frames 633 in chronological order to enable their being visually presented in a proper sequence that enables viewing of motion within the motion video 880.

One or both of the decryption component 647 and the decompression component 645 may employ whatever indications of parameters are provided by messages of the message data 470 concerning individual compressed frames, GOPs 432 and/or the entirety of the compressed video data 430. As previously discussed, the message data 470 includes messages that may indicate which compressed frames of the compressed video data 430 are compressed full-resolution frames and which are T-frames 439, thereby enabling selective decompression of only one or the other. The message data 470 may also indicate which compressed frames are encrypted, enabling selective use of the decryption component 647.

In some embodiments, the message data 470 may provide an indication of an interval at which IDR frames 434 and/or T-frames 439 are located among the compressed frames of the compressed video data 430 to enable more efficient decompression by precluding the need to individually examine each compressed frame to find the IDR frames 434 and/or the T-frames 439. Such an interval may be expressed as a quantity of compressed frames. Alternatively, where a type of compression is employed that entails the organization of compressed frames into the GOPs 432, the location of the T-frames 439 may be expressed as a quantity of frames from the first or last location of a compressed frame within each GOP 432.

In some embodiments, it may be deemed advantageous in generating the compressed video data 430 to encrypt the full-resolution frames 333 to prevent unauthorized viewing of the motion video 880 at full resolution, but while leaving at least a subset of the T-frames 439 unencrypted to allow previews and/or indices of scenes of the motion video 880 based on thumbnail images to be freely viewed. This may be applicable to a type of pay-per-view functionality that may be provided by the viewing device 600 in which an operator of the viewing device 600 is able permitted to view previews of motion videos based on thumbnail images for free, but must provide payment of some form to view a selected motion video's full-resolution frames. To prevent an operator of the viewing device 600 from "cheating" by viewing the entirety of the motion video 880 by viewing its thumbnail images 333, the message data 470 may also provide an indication of a selected maximum quantity of the thumbnail image 333 that may be viewed in such a preview.

The control routine 640 includes a presentation component 648 to visually present the decompressed full-resolution frames 633 and/or the decompressed thumbnail images 639 on the display 680. The control routine 640 may also monitor the input device 620 (if present) for indications of operator input conveying commands to select one or both of the full-resolution frames 633 or the thumbnail images 639 to be visually presented for viewing.

As has been discussed, a command may be so received to visually present the full-resolution frames 633 in chronological order to thereby present the motion video 880 on the display 680 for viewing at full resolution. In response, the presentation component 648 signals the decompression component to decompress the compressed full-resolution frames of the compressed video data 430 to generate the decompressed full-resolution frames 633 needed for visual presentation. Where the message data 470 indicates that the compressed full-resolution frames are encrypted, the presentation component 648 may also signal the decryption component 647 to decrypt those compressed full-resolution frames to enable their decompression.

However, as has also been discussed, a command may be received to visually present at least a subset of the thumbnail images 639 in chronological order to present what may be only a portion of the motion video 880 at the resolution of the thumbnail images 639 as a preview for viewing. In response, the presentation component 648 signals the decompression component to decompress the T-frames 439 of the compressed video data 430 to generate the decompressed thumbnail images 639 needed for visual presentation. Alternatively or additionally, the presentation component 648 may respond to a period of inactivity in which neither commands are received and/or in which no decompressed frames are visually presented by signaling the decompression component to decompress at least a subset of the T-frames 439 to enable the presentation component 648 to visually present them as a preview to perhaps spur an operator of the viewing device 600 to select the motion video 880 for viewing. Regardless of what prompts the decompression of T-frames 439, if the message data 470 indicates that those T-frames 439 are encrypted, the presentation component 648 may signal the decryption component 647 to decrypt them.

Further, a command may be received to visually present an index that includes at least a subset of the thumbnail images 639 on the display 680 to enable an operator of the viewing device 600 to select a portion of the motion video 880 to view in full resolution. As has been discussed, where the type of compression employed is a version of MPEG, the T-frame(s) 439 associated with compressed full-resolution frames of a first GOP 432 into a second GOP 432 that chronologically precedes the first GOP 432. This may be deemed advantageous where the compressed video data 430 is either still being received or where portions are provided to the viewing device 600 in response to requests for those portions (e.g., in an "on demand" manner). Thus, a T-frame 439 associated with the compressed full-resolution frames of a chronologically later GOP 432 would be received by the viewing device 600 along with the compressed full-resolution frames of a chronologically earlier GOP 432. This would enable the requesting and/or receipt of the later GOP 432 only if an operator of the viewing device 600 commands to view the compressed full-resolution frames of the later GOP 432 after viewing the thumbnail images of that T-frame 439.

Figure 10:
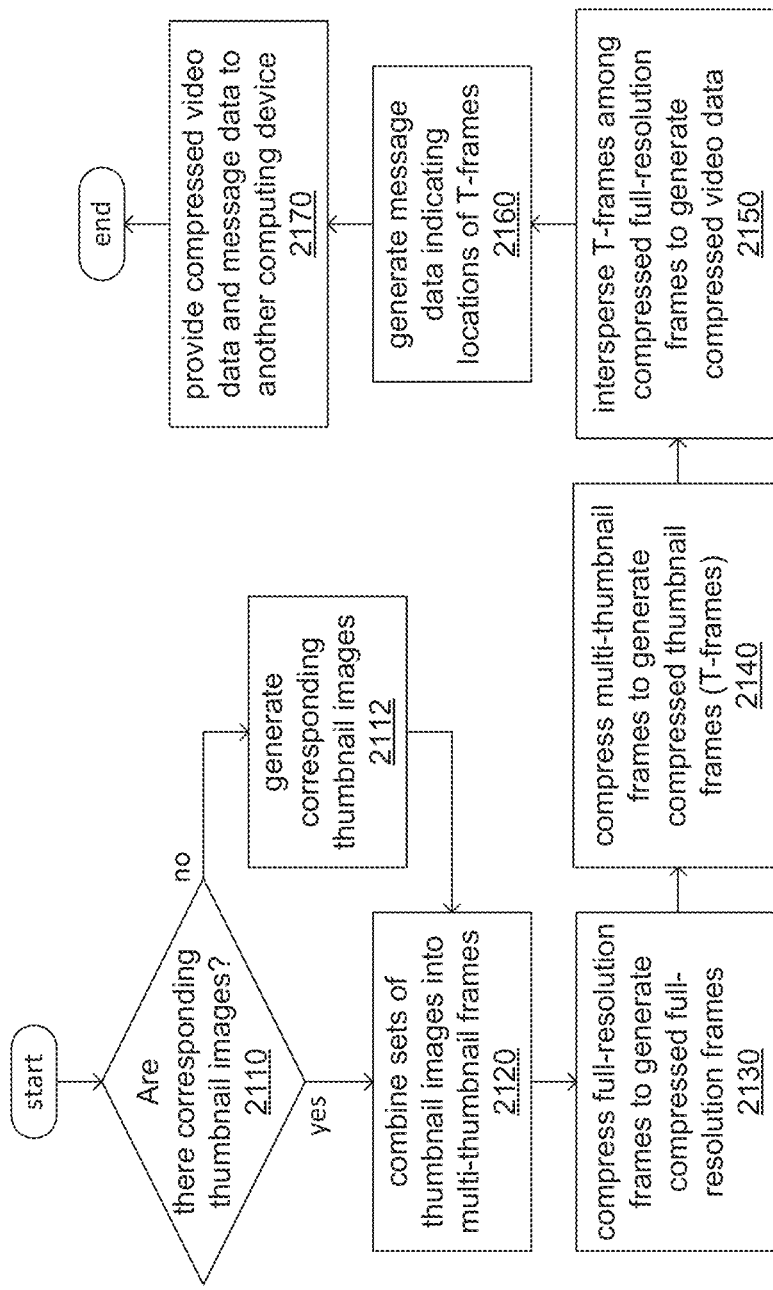
FIGS. 10-13 each illustrate a logic flow according to an embodiment.

FIG. 10 illustrates one embodiment of a logic flow 2100. The logic flow 2100 may be representative of some or all of the operations executed by one or more embodiments described herein. More specifically, the logic flow 2100 may illustrate operations performed by the processor component 350 or 450 in executing at least the control routine 440, and/or performed by other component(s) of the computing device 300 or the controller 400, respectively.

At 2110, a processor component of a computing device (e.g., either the processor component 350 of the computing device 300, or the processor component 450 of the controller 400) makes a check of whether the uncompressed full-resolution frames of a motion video are accompanied by corresponding uncompressed thumbnail images at 2110. If not, then the processor component generates them at 2112.

At 2120, sets of the uncompressed thumbnail images are combined into uncompressed multi-thumbnail frames. As previously discussed, thumbnail images may be organized within such multi-thumbnail frames in a tiled manner that may greatly facilitate use of motion estimation between blocks of pixels of different thumbnail images within the same multi-thumbnail frame.

At 2130, the uncompressed full-resolution frames are compressed to form compressed full-resolution frames. As previously discussed, where a version of MPEG or a similar type of compression is employed, the compressed full-resolution frames may include one or more of IDR frames, I-frames, P-frames and B-frames.

At 2140, the uncompressed multi-thumbnail frames are compressed to form compressed thumbnail frames (T-frames), which are then interspersed among the compressed full resolution frames at 2150 to generate compressed video data that includes both compressed full-resolution frames and compressed thumbnail images. As previously discussed, where the type of compression is a version of MPEG or similar type of compression, the compressed full-resolution frames are organized into GOPs and are organized into a coding order within each GOP with an IDR frame at the first coding position. In contrast, the GOPs may be organized in chronological order. Further, the T-frames may be interspersed among the compressed full-resolution frames without regard to whatever order the compressed full-resolution frames may be organized into.

At 2160, a message data associated with the compressed video data is generated, and includes at least messages that indicate locations of the T-frames. Such messages may indicate the locations of T-frames from a first or last coding order position within GOPs, or may indicate the locations of T-frames by specifying an interval among the series of compressed frames at which the T-frames are located.

At 2170, the compressed video data and the message data are provided to another computing device (e.g., the viewing device 600). As previously discussed, this may be done by transmissions via a network and/or via storage of the compressed video data and the message data onto a removable machine-readable storage medium that is physically conveyed to the other computer and read by the other computer.

Figure 11:
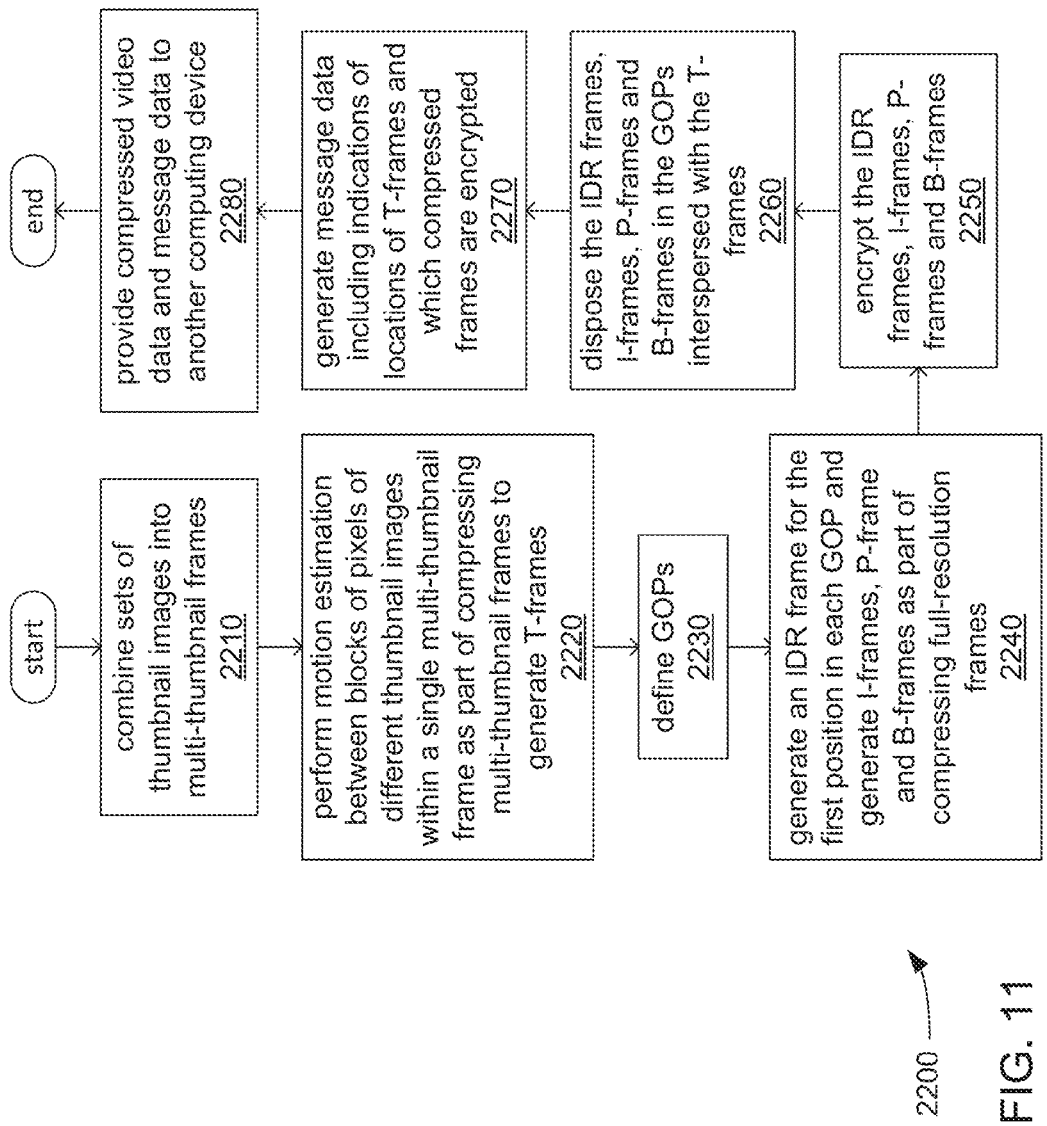

FIG. 11 illustrates one embodiment of a logic flow 2200. The logic flow 2200 may be representative of some or all of the operations executed by one or more embodiments described herein. More specifically, the logic flow 2200 may illustrate operations performed by the processor component 350 or 450 in executing at least the control routine 440, and/or performed by other component(s) of the computing device 300 or the controller 400, respectively.

At 2210, a processor component of a computing device (e.g., either the processor component 350 of the computing device 300, or the processor component 450 of the controller 400) combines sets of uncompressed thumbnail images into uncompressed multi-thumbnail frames. As previously discussed, thumbnail images may be organized within such multi-thumbnail frames in a tiled manner that may greatly facilitate use of motion estimation between blocks of pixels of different thumbnail images within the same multi-thumbnail frame. And, at 2220, such motion estimation is performed within a single multi-thumbnail frame as part of compressing multi-thumbnail frames to generate a compressed thumbnail frames (T-frames).

At 2230, GOPs are defined into which compressed full-resolution frames may be organized. As previously discussed, such organization of compressed full-resolution frames into GOPs may be a coding order with an IDR frame disposed at the first coding order position in each GOP. And, at 2240, IDR frames, I-frames, P-frames and B-frames are generated, with an IDR frame slated to be so disposed at the first position in each GOP at 2240.

At 2250, the IDR frames, I-frames, P-frames and B-frames are encrypted to protect these compressed full-resolution frames from unauthorized viewing. However, as previously discussed, at least a subset of the T-frames may be left unencrypted to enable their use more freely to provide a preview and/or visual index of the images of the compressed full-resolution frames.

At 2260, the IDR frames, I-frames, P-frames and B-frames are disposed within the GOPs with the T-frames interspersed among these compressed full-resolution frames. As previously discussed, the T-frames may be interspersed among the compressed full-resolution frames without regard to whatever order the compressed full-resolution frames may be organized into within each GOP.

At 2270, a message data associated with the compressed video data is generated, and includes at least messages that indicate locations of the T-frames and that indicate which of the compressed frames are encrypted. As previously discussed, such messages may provide indications of any of a variety of parameters useful in performing decompression.

At 2280, the compressed video data and the message data are provided to another computing device (e.g., the viewing device 600). As previously discussed, this may be done by transmissions via a network and/or via storage of the compressed video data and the message data onto a removable machine-readable storage medium that is physically conveyed to the other computer and read by the other computer.

Figure 12:
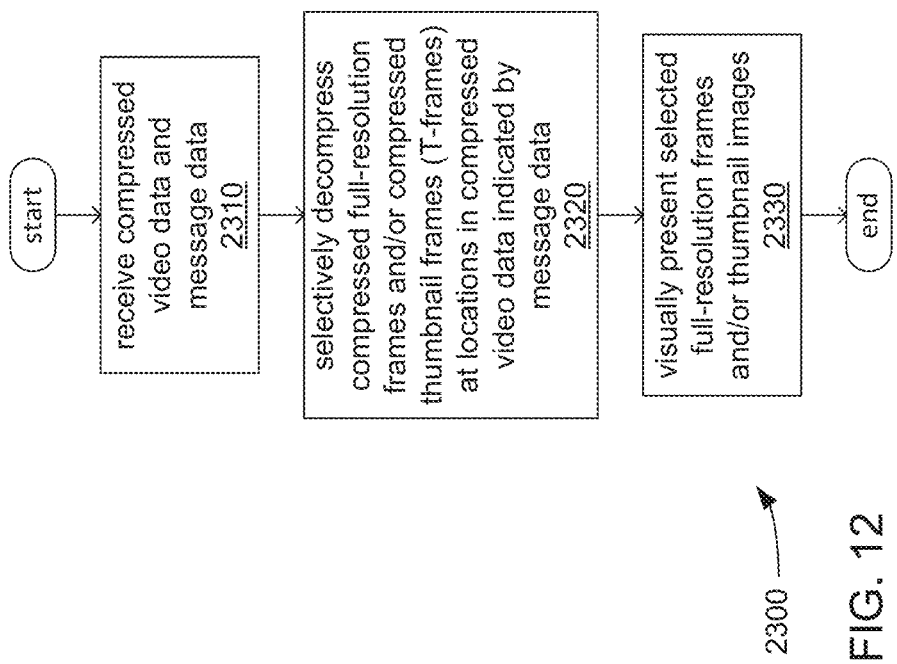

FIG. 12 illustrates one embodiment of a logic flow 2300. The logic flow 2300 may be representative of some or all of the operations executed by one or more embodiments described herein. More specifically, the logic flow 2300 may illustrate operations performed by the processor component 650 in executing at least the control routine 640, and/or performed by other component(s) of the display device 600.

At 2310, a processor component of a display device (e.g., the processor component 650 of the display device 600) receives a compressed video data and associated message. As previously discussed, the compressed video data and the message data may be received via a network and/or by reading a removable machine-readable storage medium onto which the compressed video data and the message data have been stored.

At 2320, one or both of the compressed full-resolution frames and the T-frames are selectively decoded. In so doing, messages of the message data providing indications of the locations of the compressed full-resolution frames and the T-frames are used in selected one or the other of these compressed frames to decompress. As previously discussed, which of these compressed frames are decompressed may be based on commands received to visually present one or the other.

At 2330, the selected ones of the compressed frames are visually presented on a display following decompression. Specifically, one or both of the decompressed full-resolution frames or the decompressed thumbnail images (decompressed from the T-frames) are visually presented.

Figure 13:
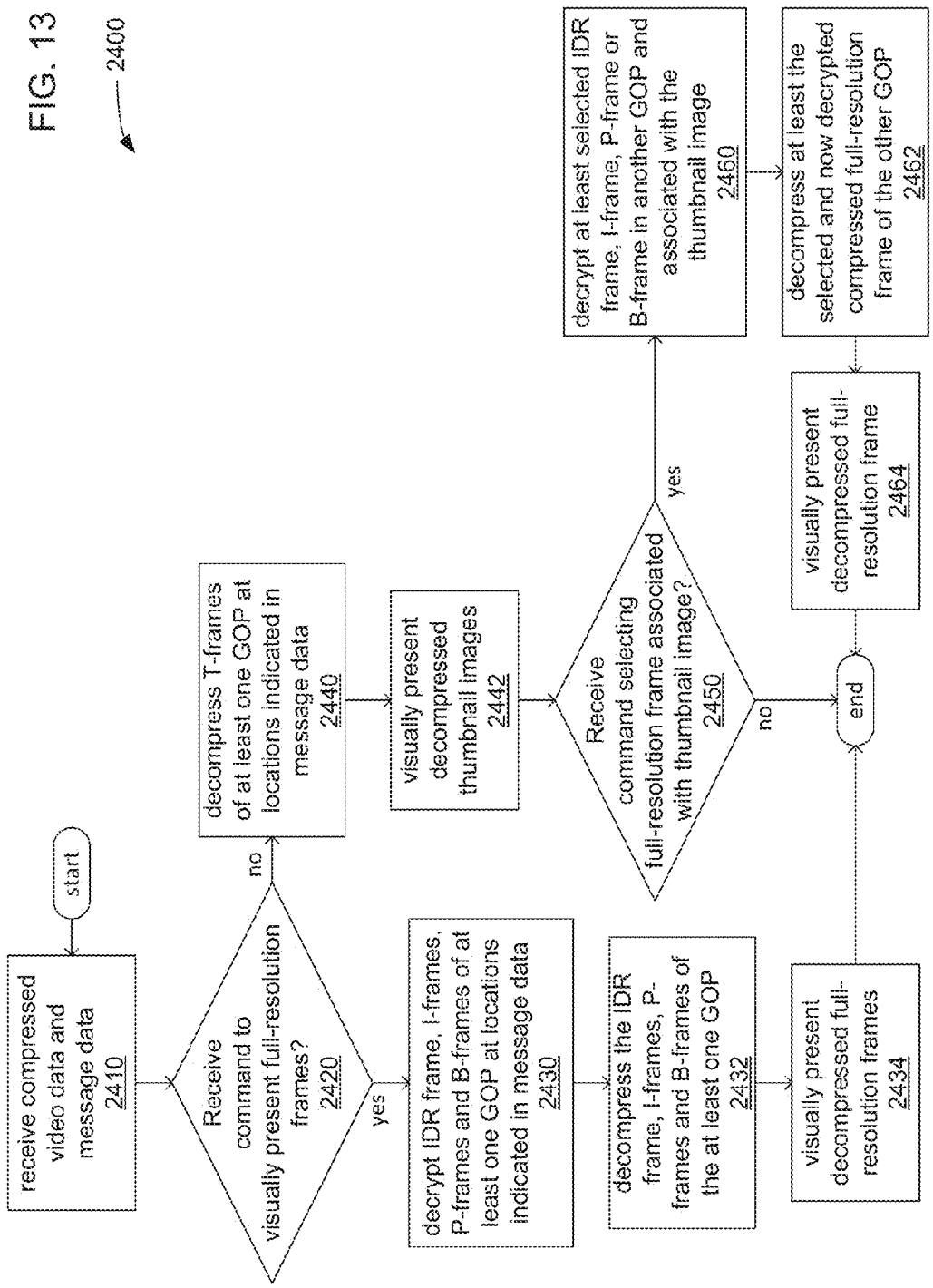

FIG. 13 illustrates one embodiment of a logic flow 2400. The logic flow 2400 may be representative of some or all of the operations executed by one or more embodiments described herein. More specifically, the logic flow 2400 may illustrate operations performed by the processor component 650 in executing at least the control routine 640, and/or performed by other component(s) of the viewing device 600.

At 2410, a processor component of a display device (e.g., the processor component 650 of the display device 600) receives a compressed video data and associated message. As previously discussed, the compressed video data and the message data may be received via a network and/or by reading a removable machine-readable storage medium onto which the compressed video data and the message data have been stored.

At 2420, a check has been made as to whether a command has been received to visually present the compressed full-resolution frames of the compressed video data. If so, then the full resolution frames (e.g., the IDR frame, I-frames, P-frames and/or B-frames) of at least one GOP are decrypted at 2430. As previously discussed, such decryption may be triggered by a message in the message data indicating that these compressed full-resolution frames are encrypted, and one or more messages of the message data indicating the locations of these frames in the at least one GOP may be used to determine which frames are the compressed full-resolution frames. The now decrypted compressed full-resolution frames are then decompressed at 2432, and the resulting decompressed full-resolution frames are then visually presented at 2434.

However, if no such command is received at 2420, then the T-frame(s) of at least one GOP are decompressed at 2440. As previously discussed, one or more messages of the message data indicating the locations of the T-frames may in the at least one GOP may be used to determine which frames are the T-frames. At 2442, the resulting decompressed thumbnail images are visually presented. As previously discussed, the visual presentation of thumbnail images may be triggered by a command to do so, or may be triggered by the passage of a selected period of time since the last presentation of full-resolution frames and/or thumbnail images, and/or by the passage of a selected period of time since the receipt of the last command. As also previously discussed, the visual presentation of thumbnail images may be as part of a preview of at least a portion of a motion video and/or as part of a visual index allowing selection of specific full-resolution frame(s) to be visually presented for viewing.

At 2450, a check is made as to whether such a command has been received indicating such a selection for viewing of one or more full-resolution frames associated with a visually presented thumbnail image. If so, then at least the selected one or more compressed full-resolution frames (e.g., the one or more selected IDR frames, I-frames, P-frames or B-frames) of another GOP in which they are disposed are decrypted at 2460. Then, the now decrypted compressed full-resolution frames are decompressed at 2462, and the resulting decompressed full-resolution frames are visually presented at 2464. As previously discussed, T-frames that include thumbnail images associated with a set of compressed full-resolution frames stored of one GOP may be stored in a chronologically preceding GOP.

Figure 14:
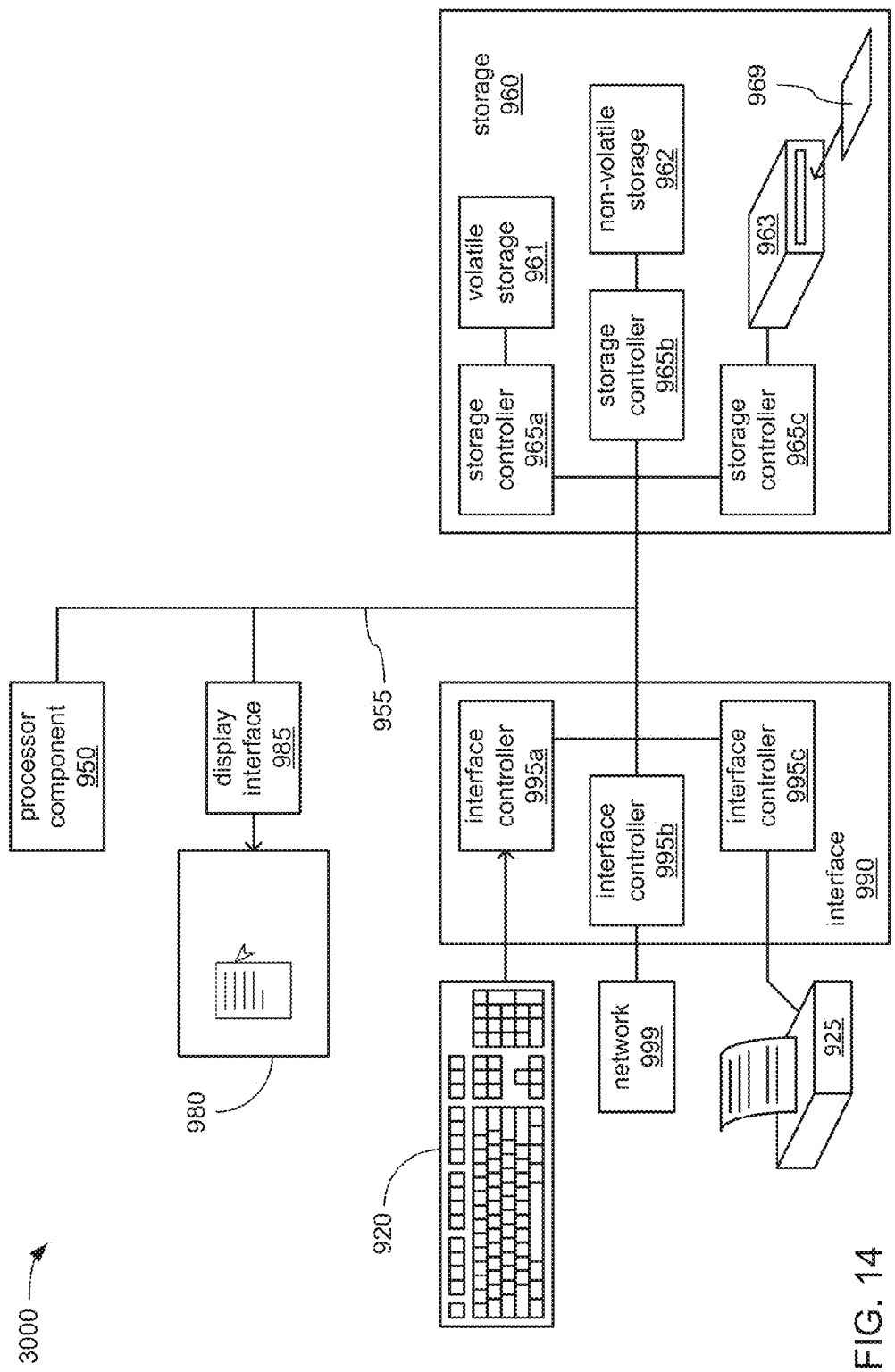
FIG. 14 illustrates a processing architecture according to an embodiment.

FIG. 14 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 600, and/or the controller 400. It should be noted that components of the processing architecture 3000 are given reference numbers in which the last two digits correspond to the last two digits of reference numbers of at least some of the components earlier depicted and described as part of the computing devices 100, 300 and 600, as well as the controller 400. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 450 and 650) may include any of a wide variety of commercially available processors, employing any of a wide variety of technologies and implemented with one or more cores physically combined in any of a number of ways.

As previously discussed, the storage 960 (corresponding to the storages 360, 460 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 such that it may include multiple distinct types of storage is in recognition of the commonplace use of more than one type of storage device in computing devices in which one type provides relatively rapid reading and writing capabilities enabling more rapid manipulation of data by the processor component 950 (but which may use a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 15:
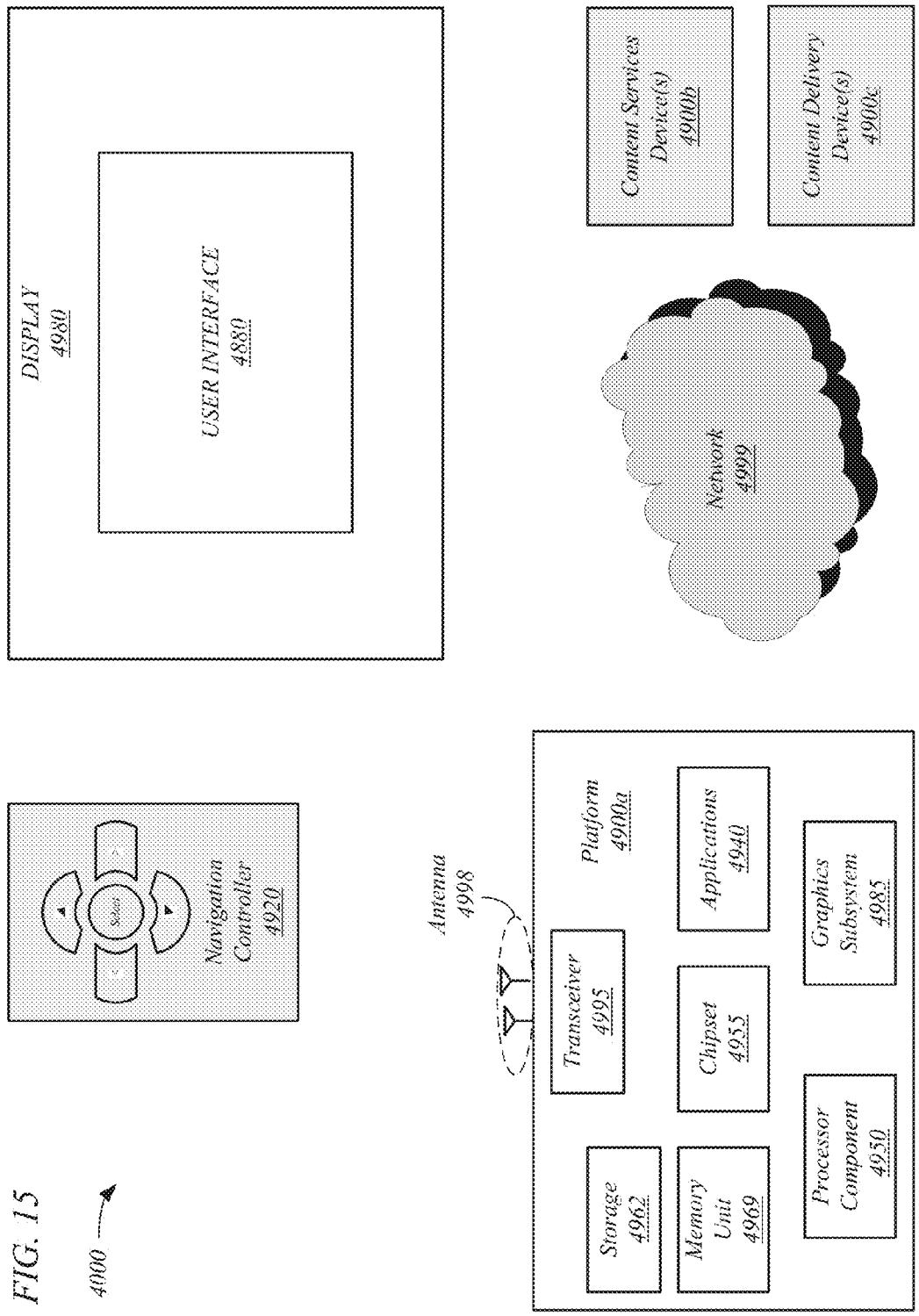
FIG. 15 illustrates another alternate embodiment of a graphics processing system.

FIG. 15 illustrates an embodiment of a system 4000. In various embodiments, system 4000 may be representative of a system or architecture suitable for use with one or more embodiments described herein, such as the graphics processing system 1000; one or more of the computing devices 100, 300 or 600; and/or one or both of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although a limited number of elements are shown and in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 350 or 650, and/or to processor component 950 of FIG. 14.

Memory unit 4969 may be implemented using any machine-readable or computer-readable media capable of storing data, and may be the same as or similar to storage media 969 of FIG. 14.

Transceiver 4995 may include one or more radios capable of transmitting and receiving signals using various suitable wireless communications techniques, and may be the same as or similar to transceiver 995b in FIG. 14.

Display 4980 may include any television type monitor or display, and may be the same as or similar to one or more of displays 380 and 680, and/or to display 980 in FIG. 14.

Storage 4962 may be implemented as a non-volatile storage device, and may be the same as or similar to non-volatile storage 962 in FIG. 14.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
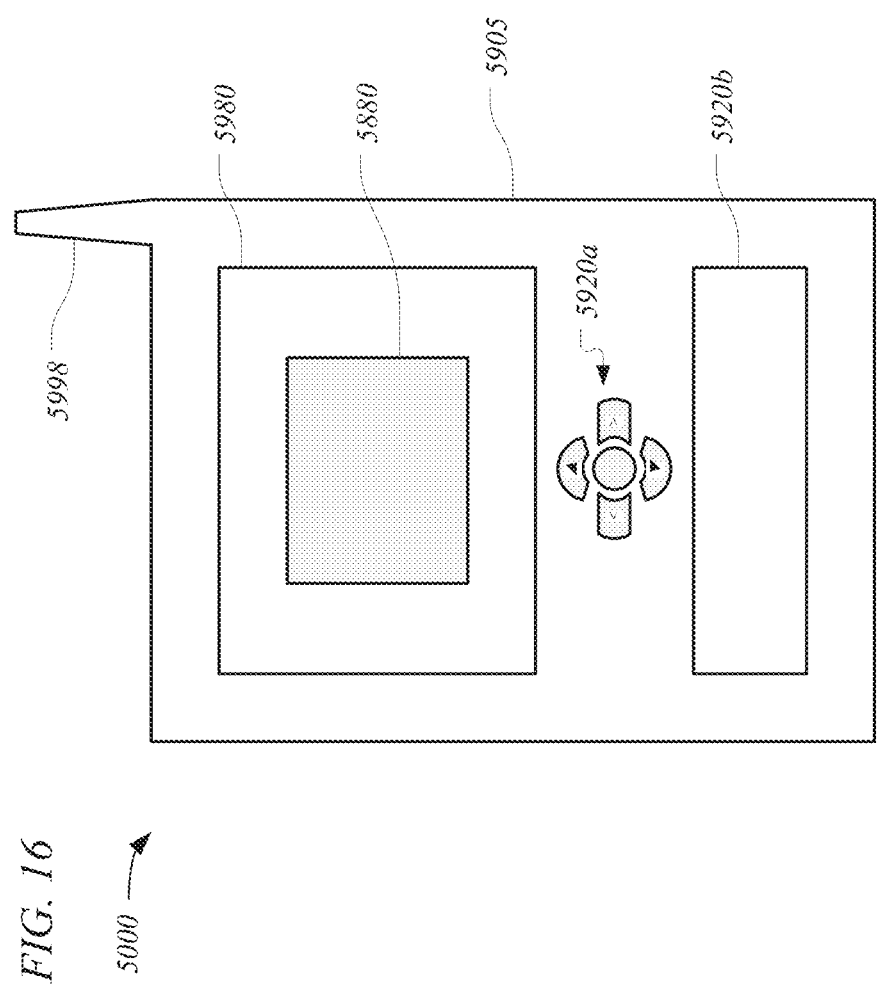
FIG. 16 illustrates an embodiment of a device.

As described above, system 4000 may be embodied in varying physical styles or form factors. FIG. 16 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 15. Navigation controller 5920a may include one or more navigation features which may be used to interact with user interface 5880, and may be the same as or similar to navigation controller 4920 in FIG. 15. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The detailed disclosure now turns to providing examples that pertain to further embodiments. Examples one through sixty three provided below are intended to be exemplary and non-limiting.

In a first example, a device to compress video frames may comprise a processor component; and a compression component for execution by the processor component to intersperse at least one compressed thumbnail frame (T-frame) among multiple compressed full-resolution frames of a motion video arranged in a coding order in a compressed video data, the T-frame comprising multiple thumbnail images of the motion video in compressed form.

In a second example, the device of example 1 may comprise a combining component for execution by the processor component to combine the multiple thumbnail images into a multi-thumbnail frame, and the compression component to compress the multi-thumbnail frame to generate the T-frame.

In a third example of the device of example two, the multiple thumbnail images may comprise chronologically adjacent thumbnail images.

In a fourth example of the device of example two, the combining component to organize the multiple thumbnail images within the multi-thumbnail frame in a tiled manner.

In a fifth example of the device of example four, the compression component comprising a motion estimator for execution by the processor component to compare pixels of two thumbnail images of the multi-thumbnail frame to derive a motion vector describing a difference between the two thumbnail images.

In a sixth example, the example of claim 1 may comprise a thumbnail generator for execution by the processor component to generate the multiple thumbnail images from full-resolution frames of the motion video.

In a seventh example of the device of example one, the compression component to employ a version of MPEG to generate a group-of-pictures (GOP) comprising the multiple compressed full-resolution frames and the at least one T-frame interspersed among the multiple compressed full-resolution frames, to generate an instantaneous decoder refresh frame (IDR frame), and to position the IDR frame at a first coding order position of the GOP.

In a eighth example of the device of example seven, the compression component to generate a message data associated with the compressed video data comprising a message indicating a position of the T-frame within the GOP.

In a ninth example of the device of example one, the compression component to generate a message data associated with the compressed video data comprising a message indicating a parameter of one of a compressed full-resolution frame of the multiple compressed full-resolution frames or the T-frame, the parameter comprising one of a location among the multiple compressed full-resolution frames, a pixel resolution, a color depth, a color space, a quantity of thumbnail images within the T-frame, or whether a compressed frame is encrypted.

In a tenth example of the device of example nine, the message data comprising a first message indicating the multiple compressed full-resolution frames as encrypted and a second message indicating the at least one T-frame as not encrypted.

An eleventh example of the device of example nine may comprise an interface to transmit the compressed video data and the message data to a viewing device.

A twelfth example of the device of example one may comprise an encryption component for execution by the processor component to selectively encrypt the multiple compressed full-resolution frames and the at least one T-frame.

In a thirteenth example of the device of example twelve, the encryption component to encrypt the multiple compressed full-resolution frames and to refrain from encrypting the at least one T-frame.

In a fourteenth example, device to decompress video frames may comprise a processor component; and a decompression component to decompress at least one compressed thumbnail frame (T-frame) interspersed among multiple compressed full-resolution frames of a motion video arranged in a coding order in a compressed video data to generate at least one decompressed thumbnail image in response to a command to visually present the at least one decompressed thumbnail image, the T-frame comprising multiple thumbnail images of the motion video in compressed form.

In a fifteenth example of the device of example fourteen, the decompression component to decompress the multiple compressed full-resolution frames to generate multiple decompressed full-resolution frames in response to another command to visually present the multiple decompressed full-resolution frames.

In a sixteenth example, the device of example fourteen may comprise a presentation component to monitor an input device for an indication of receipt of the command.

In a seventeenth example of the device of example sixteen, the presentation component to visually present the at least one decompressed thumbnail image on a display to provide a preview of at least a portion of the motion video.

In a eighteenth example, the device of example seventeen may comprise one of the input device or the display.

In a nineteenth example of the device of example fourteen, the multiple thumbnail images comprising chronologically adjacent thumbnail images.

In a twentieth example of the device of example fourteen, the decompression component comprising a motion compensator to employ a motion vector derived from a comparison of pixels of two of the multiple thumbnail images to decompress the T-frame.

In a twenty-first example of the device of example fourteen, the compressed video data comprising a group-of-pictures (GOP) that comprises the multiple compressed full-resolution frames and the at least one T-frame, the decompression component to employ a version of MPEG and a parameter indicated in a message of a message data associated with the compressed video data to decompress the T-frame, and the parameter comprising one of a location of the T-frame among the multiple compressed full-resolution frames, a pixel resolution, a color depth, a color space, a quantity of thumbnail images within the T-frame, or whether a compressed frame is encrypted.

In a twenty-second example of the device of example twenty-one, the message data comprising a first message indicating the multiple compressed full-resolution frames as encrypted and a second message indicating the at least one T-frame as not encrypted.

In a twenty-third example, the device of example twenty-one may comprise an interface to receive the compressed video data and the message data.

In a twenty-fourth example, the device of example twenty-one may comprise a decryption component for execution by the processor component to selectively decrypt the multiple compressed full-resolution frames and the at least one T-frame based on a message of the message data.

In a twenty-fifth example, a computer-implemented method for compressing video frames may comprise combining multiple thumbnail images of a motion video into a multi-thumbnail frame; compressing the multi-thumbnail frame to generate a compressed thumbnail frame (T-frame); and interspersing the T-frame among multiple compressed full-resolution frames of the motion video arranged in a coding order in a compressed video data.

In a twenty-sixth example of the method of example twenty-five, the multiple thumbnail images comprising chronologically adjacent thumbnail images.

In a twenty-sixth example of the method of example twenty-five, the method comprising organizing the multiple thumbnail images within the multi-thumbnail frame in a tiled manner.

In a twenty-eighth example of the method of example twenty-seven, the method comprising deriving a motion vector describing a difference between blocks of pixels of two thumbnail images of the multi-thumbnail frame to compress the multi-thumbnail frame.

In a twenty-ninth example of the method of example twenty-five, the method comprising generating the multiple thumbnail images from full-resolution frames of the motion video.

In a thirtieth example of the method of example twenty-five, the method comprising: employing a version of MPEG to generate a group-of-pictures (GOP) comprising the multiple compressed full-resolution frames and the T-frame interspersed among the multiple compressed full-resolution frames; generating an instantaneous decoder refresh frame (IDR frame); disposing the IDR frame at a first coding order position of the GOP; and generating a message data associated with the compressed video data comprising a message indicating a position of the T-frame within the GOP.

In a thirty-first example of the method of example twenty-five, the method comprising generating a message data associated with the compressed video data comprising a message indicating a parameter of one of a compressed full-resolution frame of the multiple compressed full-resolution frames or the T-frame, the parameter comprising one of a location among the multiple compressed full-resolution frames, a pixel resolution, a color depth, a color space, a quantity of thumbnail images within the T-frame, or whether a compressed frame is encrypted.

In a thirty-second example of the method of example thirty-one, the message data comprising a first message indicating the multiple compressed full-resolution frames as encrypted and a second message indicating the T-frame as not encrypted.

In a thirty-third example of the method of example thirty-one, the method comprising transmitting the compressed video data and the message data to a viewing device.

In a thirty-fourth example of the method of example twenty-five, the method comprising encrypting the multiple compressed full-resolution frames and refraining from encrypting the T-frame.

In a thirty-fifth example, at least one machine-readable storage medium may comprise instructions that when executed by a computing device, cause the computing device to: combine multiple thumbnail images of a motion video into a multi-thumbnail frame; compress the multi-thumbnail frame to generate a compressed thumbnail frame (T-frame); and intersperse the T-frame among multiple compressed full-resolution frames of the motion video arranged in a coding order in a compressed video data.

In a thirty-sixth example of the at least one machine-readable storage medium of example thirty-five, the multiple thumbnail images comprising chronologically adjacent thumbnail images.

In a thirty-sixth example of the at least one machine-readable storage medium of example thirty five, the computing device caused to organize the multiple thumbnail images within the multi-thumbnail frame in a tiled manner.

In a thirty-eighth example of the at least one machine-readable storage medium of example thirty-seven, the computing device caused to derive a motion vector describing a difference between blocks of pixels of two thumbnail images of the multi-thumbnail frame to compress the multi-thumbnail frame.

In a thirty-ninth example of the at least one machine-readable storage medium of example thirty-five, the computing device caused to generate the multiple thumbnail images from full-resolution frames of the motion video.

In a fortieth example of the at least one machine-readable storage medium of example thirty-five, the computing device caused to: employ a version of MPEG to generate a group-of-pictures (GOP) comprising the multiple compressed full-resolution frames and the T-frame interspersed among the multiple compressed full-resolution frames; generate an instantaneous decoder refresh frame (IDR frame); dispose the IDR frame at a first coding order position of the GOP; and generate a message data associated with the compressed video data comprising a message indicating a position of the T-frame within the GOP.

In a forty-first example of the at least one machine-readable storage medium of example thirty-five, the computing device caused to generate a message data associated with the compressed video data comprising a message indicating a parameter of one of a compressed full-resolution frame of the multiple compressed full-resolution frames or the T-frame, the parameter comprising one of a location among the multiple compressed full-resolution frames, a pixel resolution, a color depth, a color space, a quantity of thumbnail images within the T-frame, or whether a compressed frame is encrypted.

In a forty-second example of the at least one machine-readable storage medium of example forty-one, the message data comprising a first message indicating the multiple compressed full-resolution frames as encrypted and a second message indicating the T-frame as not encrypted.

In a forty-third example of the at least one machine-readable storage medium of example forty-one, the computing device caused to transmit the compressed video data and the message data to a viewing device.

In a forty-fourth example of the at least one machine-readable storage medium of example thirty-five, the computing device caused to encrypt the multiple compressed full-resolution frames and refraining from encrypting the T-frame.

In a forty-fifth example, a computer-implemented method for decompressing video frames may comprise: receiving a command to visually present at least one decompressed thumbnail image of a motion video; and decompressing at least one compressed thumbnail frame (T-frame) interspersed among multiple compressed full-resolution frames of the motion video arranged in a coding order in a compressed video data to generate the at least one decompressed thumbnail image in response to the command, the T-frame comprising multiple thumbnail images of the motion video in compressed form.

In a forty-sixth example of the computer-implemented method of example forty-five, the method comprising: receiving another command to visually present multiple decompressed full-resolution frames; and decompressing the multiple compressed full-resolution frames to generate the multiple decompressed full-resolution frames in response to the other command.

In a forty-seventh example of the computer-implemented method of example forty-five, the method comprising: monitoring an input device for an indication of receiving the command; and visually presenting the at least one decompressed thumbnail image on a display to provide a preview of at least a portion of the motion video.

In a forty-eighth example of the computer-implemented method of example forty-five, the multiple thumbnail images comprising chronologically adjacent thumbnail images.

In a forty-ninth example of the computer-implemented method of example forty-five, the method comprising employing a motion vector derived from a comparison of pixels of two of the multiple thumbnail images to decompress the T-frame.

In a fiftieth example of the computer-implemented method of example forty-five, the compressed video data comprising a group-of-pictures (GOP) that comprises the multiple compressed full-resolution frames and the at least one T-frame, the method comprising employing a version of MPEG and a parameter indicated in a message of a message data associated with the compressed video data to decompress the T-frame, and the parameter comprising one of a location of the T-frame among the multiple compressed full-resolution frames, a pixel resolution, a color depth, a color space, a quantity of thumbnail images within the T-frame, or whether a compressed frame is encrypted.

In a fifty-first example of the computer-implemented method of example fifty, the message data comprising a first message indicating the multiple compressed full-resolution frames as encrypted and a second message indicating the at least one T-frame as not encrypted.

In a fifty-second example of the computer-implemented method of example fifty, the method comprising selectively decrypting the multiple compressed full-resolution frames and the at least one T-frame based on a message of the message data.

In a fifty-third example, at least one machine-readable storage medium may comprise instructions that when executed by a computing device, cause the computing device to: receive a command to visually present at least one decompressed thumbnail image of a motion video; and decompress at least one compressed thumbnail frame (T-frame) interspersed among multiple compressed full-resolution frames of the motion video arranged in a coding order in a compressed video data to generate the at least one decompressed thumbnail image in response to the command, the T-frame comprising multiple thumbnail images of the motion video in compressed form.

In a fifty-fourth example of the at least one machine-readable storage medium of example fifty-three, the computing device caused to: receive another command to visually present multiple decompressed full-resolution frames; and decompress the multiple compressed full-resolution frames to generate the multiple decompressed full-resolution frames in response to the other command.

In a fifty-fifth example of the at least one machine-readable storage medium of example fifty-three, the computing device caused to: monitor an input device for an indication of receiving the command; and visually present the at least one decompressed thumbnail image on a display to provide a preview of at least a portion of the motion video.

In a fifty-sixth example of the at least one machine-readable storage medium of example fifty-three, the multiple thumbnail images comprising chronologically adjacent thumbnail images.

In a fifty-seventh example of the at least one machine-readable storage medium of example fifty-three, the computing device caused to employ a motion vector derived from a comparison of pixels of two of the multiple thumbnail images to decompress the T-frame.

In a fifty-eighth example of the at least one machine-readable storage medium of example fifty-three, the compressed video data comprising a group-of-pictures (GOP) that comprises the multiple compressed full-resolution frames and the at least one T-frame, the computing device caused to employing a version of MPEG and a parameter indicated in a message of a message data associated with the compressed video data to decompress the T-frame.

In a fifty-ninth example of the at least one machine-readable storage medium of example fifty-three, the compressed video data comprising a group-of-pictures (GOP) that comprises the multiple compressed full-resolution frames and the at least one T-frame, the computing device caused to employ a version of MPEG and a parameter indicated in a message of a message data associated with the compressed video data to decompress the T-frame, and the parameter comprising one of a location of the T-frame among the multiple compressed full-resolution frames, a pixel resolution, a color depth, a color space, a quantity of thumbnail images within the T-frame, or whether a compressed frame is encrypted.

In a sixtieth example of the at least one machine-readable storage medium of example fifty-nine, the message data comprising a first message indicating the multiple compressed full-resolution frames as encrypted and a second message indicating the at least one T-frame as not encrypted.

In a sixty-first example of the at least one machine-readable storage medium of example fifty-three, the computing device caused to selectively decrypt the multiple compressed full-resolution frames and the at least one T-frame based on a message of the message data.

In a sixty-second example, at least one machine-readable storage medium may comprise instructions that when executed by a computing device, cause the computing device to perform the method of any of examples twenty-five through thirty-four or forty-five through fifty-two.

In a sixty-third example, an apparatus to receive commands may comprise means for performing the method of any of examples twenty-five through thirty-four or forty-five through fifty-two.

Other embodiments and examples are described and claimed.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device to compress video frames comprising:
   a processor component;
   a compression component for execution by the processor component to intersperse at least one compressed thumbnail frame (T-frame) among multiple compressed full-resolution frames of a motion video arranged in a coding order in a compressed video data, the T-frame comprising multiple thumbnail images of the motion video in compressed form, each of the multiple thumbnail images to correspond to a different respective one of multiple full-resolution frames of the motion video, the multiple thumbnail images comprising chronologically adjacent thumbnail images;
an encryption component to encrypt the multiple compressed full-resolution frames; and
an interface to transmit the compressed video data, the at least one T-frame to remain unencrypted in the compressed video data.

2. The device of claim 1, comprising a combining component for execution by the processor component to combine the multiple thumbnail images into a multi-thumbnail frame, and the compression component to compress the multi-thumbnail frame to generate the T-frame.

3. The device of claim 2, the combining component to organize the multiple thumbnail images within the multi-thumbnail frame in a tiled manner.

4. The device of claim 3, the compression component comprising a motion estimator for execution by the processor component to compare pixels of two thumbnail images of the multi-thumbnail frame to derive a motion vector describing a difference between the two thumbnail images.

5. The device of claim 1, the compression component to generate a message data associated with the compressed video data comprising a message indicating a parameter of one of a compressed full-resolution frame of the multiple compressed full-resolution frames or the T-frame, the parameter comprising one of a location among the multiple compressed full-resolution frames, a pixel resolution, a color depth, a color space, a quantity of thumbnail images within the T-frame, or whether a compressed frame is encrypted.

6. The device of claim 5, the interface to transmit the compressed video data and the message data to a viewing device.

7. A device to decompress video frames comprising:
a processor component;
a decompression component to decompress at least one compressed thumbnail frame (T-frame) interspersed among multiple compressed full-resolution frames of a motion video arranged in a coding order in a compressed video data to generate at least one decompressed thumbnail image in response to a command to visually present the at least one decompressed thumbnail image, the T-frame comprising multiple thumbnail images of the motion video in compressed form, each of the multiple thumbnail images to correspond to a different respective one of multiple full-resolution frames of the motion video, the multiple thumbnail images comprising chronologically adjacent thumbnail images; and
a decryption component to decrypt the multiple compressed full-resolution frames, the at least one T-frame not encrypted in the compressed video data.

8. The device of claim 7, the decompression component to decompress the multiple compressed full-resolution frames to generate multiple decompressed full-resolution frames in response to another command to visually present the multiple decompressed full-resolution frames.

9. The device of claim 8, comprising a presentation component to visually present the at least one decompressed thumbnail image on a display to provide a preview of at least a portion of the motion video.

10. The device of claim 9, the presentation component to monitor an input device for an indication of receipt of at least one of the command or the other command.

11. The device of claim 10, comprising one of the input device or the display.

12. The device of claim 7, the decompression component comprising a motion compensator to employ a motion vector derived from a comparison of pixels of two of the multiple thumbnail images to decompress the T-frame.

13. The device of claim 7, the compressed video data comprising a group-of-pictures (GOP) that comprises the multiple compressed full-resolution frames and the at least one T-frame, the decompression component to employ a version of MPEG and a parameter indicated in a message of a message data associated with the compressed video data to decompress the T-frame, and the parameter comprising one of a location of the T-frame among the multiple compressed full-resolution frames, a pixel resolution, a color depth, a color space, a quantity of thumbnail images within the T-frame, or whether a compressed frame is encrypted.

14. The device of claim 9, the presentation component to visually present the multiple decompressed full-resolution frames in response to the other command.

15. A computer-implemented method for compressing video frames comprising:
combining multiple thumbnail images of a motion video into a multi-thumbnail frame, each of the multiple thumbnail images to correspond to a different respective one of multiple full-resolution frames of the motion video, the multiple thumbnail images comprising chronologically adjacent thumbnail images;
compressing the multi-thumbnail frame to generate a compressed thumbnail frame (T-frame);
interspersing the T-frame among multiple compressed full-resolution frames of the motion video arranged in a coding order in a compressed video data;
encrypting the multiple compressed full-resolution frames; and
transmitting the compressed video data, the T-frame remaining unencrypted in the compressed video data.

16. The computer-implemented method of claim 15, the method comprising organizing the multiple thumbnail images within the multi-thumbnail frame in a tiled manner.

17. The computer-implemented method of claim 16, the method comprising deriving a motion vector describing a difference between blocks of pixels of two thumbnail images of the multi-thumbnail frame to compress the multi-thumbnail frame.

18. The computer-implemented method of claim 15, the method comprising generating a message data associated with the compressed video data comprising a message indicating a parameter of one of a compressed full-resolution frame of the multiple compressed full-resolution frames or the T-frame, the parameter comprising one of a location among the multiple compressed full-resolution frames, a pixel resolution, a color depth, a color space, a quantity of thumbnail images within the T-frame, or whether a compressed frame is encrypted.

19. At least one non-transitory machine-readable storage medium comprising instructions that when executed by a computing device, cause the computing device to:
combine multiple thumbnail images of a motion video into a multi-thumbnail frame, each of the multiple thumbnail images to correspond to a different respective one of multiple full-resolution frames of the motion video, the multiple thumbnail images comprising chronologically adjacent thumbnail images;
compress the multi-thumbnail frame to generate a compressed thumbnail frame (T-frame); and intersperse the T-frame among multiple compressed full-resolution frames of the motion video arranged in a coding order in a compressed video data;

encrypt the multiple compressed full-resolution frames; and transmit the compressed video data, the T-frame to remain unencrypted in the compressed video data.

20. The at least one non-transitory machine-readable storage medium of claim 19, the computing device caused to organize the multiple thumbnail images within the multi-thumbnail frame in a tiled manner.

21. The at least one non-transitory machine-readable storage medium of claim 20, the computing device caused to derive a motion vector describing a difference between blocks of pixels of two thumbnail images of the multi-thumbnail frame to compress the multi-thumbnail frame.

22. The at least one non-transitory machine-readable storage medium of claim 19, the computing device caused to generate a message data associated with the compressed video data comprising a message indicating a parameter of one of a compressed full-resolution frame of the multiple compressed full-resolution frames or the T-frame, the parameter comprising one of a location among the multiple compressed full-resolution frames, a pixel resolution, a color depth, a color space, a quantity of thumbnail images within the T-frame, or whether a compressed frame is encrypted.

23. The at least one non-transitory machine-readable storage medium of claim 22, the message data comprising a first message indicating the multiple compressed full-resolution frames as encrypted and a second message indicating the T-frame as not encrypted.

* * * * *